US005706415A

United States Patent [19]
Kelley et al.

[11] Patent Number: 5,706,415
[45] Date of Patent: Jan. 6, 1998

[54] METHOD AND APPARATUS FOR DISTRIBUTED INTERPOLATION OF PIXEL SHADING PARAMETER VALUES

[75] Inventors: Michael Kelley, San Mateo; Stephanie Winner, Santa Clara, both of Calif.

[73] Assignee: Apple Computer, Inc., Cupertino, Calif.

[21] Appl. No.: 812,563

[22] Filed: Dec. 20, 1991

[51] Int. Cl.$^6$ .............................. G06T 11/40; G06T 15/50
[52] U.S. Cl. ........................... 395/126; 395/132; 395/505
[58] Field of Search ................................. 395/122, 125, 395/126, 163, 166, 129, 131, 132, 505

[56] References Cited

U.S. PATENT DOCUMENTS

| | | | |
|---|---|---|---|
| 4,594,673 | 6/1986 | Holly | 395/121 |
| 4,658,247 | 4/1987 | Gharachorloo | 345/196 |
| 4,697,178 | 9/1987 | Heckel | 395/122 |
| 4,791,582 | 12/1988 | Ueda et al. | 395/129 |
| 4,805,116 | 2/1989 | Liang et al. | 395/129 |
| 4,815,009 | 3/1989 | Blatin | 395/129 |
| 4,819,192 | 4/1989 | Kuragano et al. | 395/126 X |
| 4,866,637 | 9/1989 | Gonzalez-Lopez et al. | 395/126 |
| 4,885,703 | 12/1989 | Deering | 395/122 |
| 4,897,803 | 1/1990 | Calarco et al. | 395/166 |
| 4,945,500 | 7/1990 | Deering | 395/122 |
| 5,001,651 | 3/1991 | Rehme et al. | 395/126 |
| 5,025,405 | 6/1991 | Swanson | 395/126 X |
| 5,113,362 | 5/1992 | Harston et al. | 364/723 |
| 5,115,402 | 5/1992 | Matsushiro et al. | 395/141 |
| 5,123,085 | 6/1992 | Wells et al. | 395/121 |
| 5,128,872 | 7/1992 | Malachowsky et al. | 395/162 |
| 5,148,381 | 9/1992 | Sprague | 364/723 |
| 5,153,937 | 10/1992 | Wobermin et al. | 395/131 |
| 5,157,388 | 10/1992 | Kohn | 395/162 X |
| 5,163,127 | 11/1992 | Ikumi et al. | 395/126 |
| 5,214,753 | 5/1993 | Lee et al. | 395/125 |
| 5,222,204 | 6/1993 | Swanson | 395/127 |
| 5,249,264 | 9/1993 | Matsumoto | 395/122 X |
| 5,253,335 | 10/1993 | Mochizuki et al. | 395/122 |
| 5,261,041 | 11/1993 | Susman | 395/122 X |
| 5,268,995 | 12/1993 | Diefendorff et al. | 395/122 |
| 5,278,949 | 1/1994 | Thayer | 395/126 |
| 5,307,449 | 4/1994 | Kelley et al. | 395/119 |

OTHER PUBLICATIONS

Foley et al., "Computer Graphics Principles and Practice", Second Edition, Addison–Wesley Publishing Company, 1990, pp. 736–739.

"Computer Graphics Principles and Practice Second Edition", by Foley, Van Dam, Feiner and Huges, published by the Addision Wesley Publishing Corp., pp. 885–886 and pp. 899–900.

"Pyramidal Parametrics", by Lance Williams, Computer Graphics vol. 17 No. 3, Jul. 1983.

Oka, Masaaki, et al., "Real–Time Manipulation of Texture–Mapped Surfaces," Computer Graphics, vol. 21, No. 4, pp. 181–188 (Jul. 1987).

Deering, Michael, et al., "The Triangle Processor and Norman Vector Shader: A VLSI System for High Performance Graphics," Computer Graphics, vol. 22, No. 4, pp. 21–30 (Aug. 1988).

(List continued on next page.)

*Primary Examiner*—Mark K. Zimmerman
*Attorney, Agent, or Firm*—Blakely, Sokoloff, Taylor & Zafman

[57] ABSTRACT

A method and apparatus for generating pixel shading values in a computer controlled display system. Generally, the apparatus is embodied in a rendering pipeline, where each stage of the pipeline performs a particular pixels shading function, so that pixels are shaded in a distributed and direct fashion. The method of the present invention includes the steps of: deriving a pixel interpolation value from an object description, providing a first and second shading parameters and the pixel interpolation value to a first shader, generating the first shading value for the pixel, providing second and third shading parameters and the pixel interpolation value to a second shader and generating second shading value for the pixel.

5 Claims, 19 Drawing Sheets

OTHER PUBLICATIONS

Kirk, David, et al., "TheRendering Architecture of the DN10000VS," Computer Graphics, vol. 24, No. 4 pp. 299–307 (Aug. 1990).

Fuchs, Henry, et al., "Pixel–Planes 5: A Heterogeneous Multiprocessor Graphics System Using Processor Enhanced–Memories," Computer Graphics, vol. 22, No. 4, pp. 239–246(Aug. 1988).

Akeley, Kurt, et al., "High–Performance Polygon Rendering," Computer Graphics, vol. 22, No. 4, pp. 239–246 (Aug. 1988).

Gharachorloo, et al. "*Subnanosecond Pixel Rendering with Million Transistor Chips*," Computer Graphics, vol. 22, No. 4, pp. 41–49, Aug. 1988.

Deering et al. "*The Triangle Processor and Normal Vector Shader: A VLSI System for High Performance Graphics*," Computer Graphics, vol. 22, No. 4, pp. 21–30, Aug. 1988.

Gharachorloo et al. "*A Characterization of Ten Rasterization Techniques* "Computer Graphics, vol. 23, No. 3, pp. 355–368, Jul. 1988.

Fuchs, et al. "*Pixel–Planes 5: A Heterogeneous Multiprocessor Graphics System Using Processor–Enhanced Memories*," Computer Graphics, vol. 23, No. 3, pp. 79–88, Jul. 1989.

Potmesil, et al. "*The Pixel Machine: A Parallel Image Computer*," Computer Graphics, vol. 23, No. 3, pp. 69–78, Jul. 1989.

Excerpts from Foley and Van Dam (Second Edition), Articles 3.6.3, 15.6, and 18.7.2/3. A total of 12 pages.

Fiume, et al. "*A Parallel Scan Conversion Algorithm with Anti–Aliasing for a General–Purpose Ultracomputer*," Coputer Graphics, vol. 17, No. 3, pp. 141–150, Jul. 1983.

Niimi, et al. "*A Parallel Processor System for Three–Dimensional Color Graphics*," Computer Graphics, vol. 18, No. 3, pp. 67–76, Jul. 1984.

Fussell, et al. "*A VLSI–Oriented Architecture for Real–Time Raster Display of Shaded Polygons*," Graphics Interface, May 1982, pp. 373–380.

METHOD AND APPARATUS FOR DISTRIBUTED INTERPOLATION OF PIXEL SHADING PARAMETER VALUES

BACKGROUND OF THE INVENTION

1. Field of the Invention

The present invention relates to the field of computer controlled display systems, in particular, devices for rendering pixels for displaying 3-dimensional graphical images.

2. Description of the Related Art

As the processing capability of computer systems has grown, so have the ways of displaying data generated by the computer systems. Many vocations now use computer systems as a fundamental tool. For example, in the area of architectural design, 3-Dimensional graphical images (or 3-D images) of buildings or other structures are dynamically created and manipulated by a user. A computer system is able to capture and process data in order to display the 3-D image, in a time that is much faster than could be done manually. As computer hardware technology has advanced, so has the development of various methods, techniques and special purpose devices for rapidly displaying and manipulating 3-D images.

A 3-D image is represented in a computer system as a collection of graphical objects. Generally, there are two known approaches to providing high performance generation of 3-D images. A first approach focuses on rapidly drawing the graphical objects that comprise the 3-D graphics image. This approach is referred to hereinafter as the object approach. The object approach embodies a hidden surface removal algorithm commonly known as the screen Z-buffer algorithm. A second approach looks to processing the graphical objects with respect to the scanlines on which they would appear on a display. The second approach is referred to hereinafter as the scanline approach. The two approaches involve certain trade-offs. These trade-offs include cost, performance, function, quality of image, compatibility with existing computer systems and usability.

As mentioned above, a 3-D image will be represented in a computer system as a collection (or database) of graphical objects. The database may have been created through the use of any of a number of commercially available application software packages. The database may be in any of a number of standard graphics formats (e.g. PHIGS or GKS). It is common that the 3-D graphical objects are polygons (e.g. triangles) or some other high level object. The process of transforming a collection of graphical objects into a 3-D image is termed rendering. Literally, the rendering process takes object information and converts it to a pixel representation. It is in the rendering process where the object and scanline approaches differ.

In the object approach, the majority of the function related to the rendering process is performed by specially designed graphics accelerators. These graphics accelerators perform the necessary operations to create the pixel representation of the objects. The pixel representation may then be used by a display system to "draw" the graphical object on a display screen. A schematic of the object approach is illustrated in FIG. 1. In FIG. 1, a general purpose host computer 101 is used to maintain and create a 3-D Object Database 102. As described above, the 3-D Object Database contains the 3-D Objects which comprise the 3-D image. Coupled to the host processor 101 is a system frame buffer 106. The system frame buffer 106 is further coupled to the display 105. The system frame buffer 106 contains the data, e.g. RGB values, for each pixel in the display 105.

The primary components of the object approach are embodied in the graphics accelerator processor 103 and the screen Z-Buffer 104. The graphics accelerator processor 103 performs various graphical functions such as transformations and clipping. The screen Z-Buffer 104 is used for hidden surface removal. During the rendering process for a graphical image, the rendered pixels are transferred to the system frame buffer 106.

Using the object approach, each of the 3-D objects in the database 102 is rendered individually. Using a triangle object as an example, the rendering process generally involves the following steps, and is illustrated in FIG. 2a–2c:

1. Derive a 2-D triangle from the graphical object definition. The transformation step, as illustrated in FIG. 2a, results in a triangle 201 with vertices A 202, B 203 and C 204.
2. Perform any necessary clipping of the object. Clipping refers to removing portions of the object that are not within the bounds of a predetermined viewing area.
3. Generate horizontal spans for the object. A horizontal span refers to a portion of the object that intersects a scanline. A span is comprised of one or more pixels. For example, in FIG. 2b, see span 209. Typically this occurs through a linear vertical interpolation of the object.
4. Generate values for each of the pixels in the span. This process is commonly referred to as horizontal interpolation. FIG. 2c illustrates horizontal interpolation. This step will include such functions as shading of the pixels, hidden surface removal and storing the pixel values into a screen RGB frame buffer.
5. Repeat steps 3 and 4 until the object has been rendered.
6. Repeat steps 1, 2, 3, 4, and 5 until all the objects have been rendered.

The Step 1 derivation of a 2-D triangle is needed in order to map into the two-dimensional coordinate systems that are typically used by known display systems. The third coordinate of a 3-D graphical object is depth (e.g. "Z value"), and is used to determine whether or not the object is behind another object and thus out of view (i.e. hidden).

Vertical interpolation, as described in Step 3 above, is illustrated in FIG. 2b. Vertical interpolation is typically performed in the following fashion. First, active edges are determined. An active edge is defined as an edge of the object that intersects a scanline that is being processed. A span is defined as the pixels on the scanline that would connect the two intersection points of the active edges. The triangle 201 is comprised of edges 205, 206 and 207. The edge 205 is defined by the segment connecting vertices A 202 and B 203, the edge 206 is defined by the segment connecting vertices A 202 and C 204 and the edge 207 is defined by the segment connecting vertices B 203 and C 204. Generally, for any particular scanline, there will be 2 active edges. The exception being when an edge is horizontal. For example, in FIG. 2b, for scanline 208, the active edges are 205 and 206. Thus, for scanline 208, there is a span 209 for object 201.

The next step is to determine the coordinates of the end-points 210 and 211 of span 209. First it must be understood that each active edge is simply a line. Thus, the difference between successive points in the line are linear. As the vertical ordinate is simply the current scanline, only the horizontal ("X") value need be calculated. Typically, this is done using a forward differencing calculation. In forward differencing a constant, say $\Delta p$ is determined that is between each horizontal coordinate (e.g. using the formula $\Delta p = P1 -$ P0/Y1−Y0, where P1 and P0 are pertinent pixel values, such as "R" of RGB, at Y1 and Y0 for the respective end-points of an edge). Thus, the horizontal coordinate value may be determined by simply adding Δp to the previous corresponding coordinate value. It is known that using forward differencing makes other techniques of improving rendering performance, e.g. parallel processing, more difficult.

A non-desirable aspect of the forward differencing technique is that a high number of bits are required to be stored and propagated in order to retain the necessary numerical precision needed for graphics applications. This is a tradeoff to eliminating certain operations, namely division operations, that would otherwise be required in the vertical interpolation process.

Referring to FIG. 2c, shading the pixels in span 209 is then performed. Shading refers to establishing the values for the pixels comprising the span 209. The coordinates of the successive pixels on the span may be determined through the means such as a counter. Horizontal interpolation to determine shading values for each of the pixels may occur using either linear interpolation or perspective corrected interpolation. In any event, as the values for a pixel 212 are determined, the values for subsequent pixels, e.g. pixel 213 can be estimated through horizontal interpolation.

As noted above, the object approach generally utilizes the screen Z-Buffer algorithm. The screen Z-Buffer algorithm provides for hidden surface removal. Hidden surface removal is necessary for the display of 3-D images, since the surfaces in view depend on the vantage point from the viewing direction and refers to the "hiding" of areas of an object that are "behind" another object. The hidden surface removal Z-Buffer algorithm is known in the art and requires a local frame buffer. The screen contains the pixel values of objects as they are rendered. As the location of any object may be anywhere on the screen, the local frame buffer must have enough storage to support the display of all pixels on the display. Once all the objects have been rendered, the local frame buffer is transferred to the system frame buffer for display.

The Z-Buffer method utilizes the fact that each object has an attribute, typically called a Z-value, which is a 3rd dimensional ordinate. A low Z-value indicates that the object (or portion of the object) is closer to the viewer than an object with a high Z-value. The Z-Buffer stores a Z-value for each pixel on a display. During the rendering process, the Z-value of a pixel being processed is compared to Z-value in a corresponding location in the Z-buffer. If the Z-value of the pixel being processed is smaller than the value in the corresponding location in the Z-buffer, then the Z-value of the pixel being process is placed in the corresponding location in the Z-buffer. Additionally, the pixel value of the pixel being processed will be placed in the screen frame buffer, since is is now the "closest" to the viewer.

Some of the tradeoffs of object/z-buffer rendering include: the requirement of Z-buffer memory, screen frame buffer memory (in addition to a system frame buffer), and the difficulty in building a modular type of system due to a constraint of the Z-Buffer memory needing to be close to the screen buffer. As a result of such hardware requirements, the object approach can be a costly approach.

In the scanline approach the 3-D image is rendered a scanline at a time, rather than an object at a time. Thus, all objects intersecting a particular scanline are processed before writing to the scanline location in the frame buffer. The scanline approach utilizes two passes. In the first pass, 3-D objects are transformed into 2-D objects and a scanline object activation list is built. In the second pass, each of the scanlines are rendered. The flow of the scanline approach is illustrated in FIG. 3a. As in hardware rendering, transformation of the 3-D objects into 2-D objects occurs, step 301. Concurrent with the step 301, an Object Activation Database is built, step 302. The steps 301 and 302 comprise the first pass.

The Object Activation Database provides, for each scanline, a list of objects which first become active on that scanline. By becoming active, that object may be displayed on that scanline. This typically occurs by identification of the highest point of an object (i.e. its lowest Y-coordinate), and assigning it to the activation list of the corresponding scanline. The relationship of the Object Activation Database to the displayed objects is illustrated in FIG. 3b. In FIG. 3b a display screen 320 is 9 scanlines high. The scanlines 0-8 are numbered from low to high down the left hand side of the display screen 320. Objects A 321, B 322 and C 323 are to be displayed on the display screen 320. It is apparent that Object A 321 has a highest point 326 (which is on scanline 5), Object B 322 has a highest Point 324 (which is on scanline 1) and Object C 323 has a highest Point 325 (also on scanline 1).

Still referring to FIG. 3b, the resulting Object Activation List Database 329 is illustrated. As the points 324 and 325 are on scanline 1, a scanline 1 entry 327 contains the corresponding objects, namely Object B 322 and Object C 323. Additionally, a scanline 5 entry 328 contains the Object A 321.

Referring back to FIG. 3a, once the Object Activation Database 329 is generated and all the 3-D Objects have been transformed, an Active Object List is created, step 303. The Active Object List provides a source of identifying for the scanline being processed, the objects which are active (i.e. portions of which are displayable on that scanline). The Active Object List may contain either descriptive information of the 2-D object (e.g. coordinate information and shading parameter values) or may contain information defining the active edges of the 2-D object (also including shading parameter values). FIG. 3c illustrates the contents of an Active Object List 340 with respect to the screen and Object Activation List 329 of FIG. 3b. In Active Object List 340, a scanline 1 entry 341 contains the objects B and C. The objects B and C remain as an entry for scanlines 2-5. In scanline 5 entry 342, object A is included (as this is where the object A is first displayed). As objects B and C are no longer displayed after scanline 5, they are not in a scanline 6 entry 343. The entries for scanlines 6-8 are comprised solely of object A. Rendered Screen 345 illustrates how the objects would be rendered.

Referring back to FIG. 3a, once the object Activation List is created, the rendering process begins, step 304. As with hardware rendering, the next steps include 1) vertical interpolation, to determine the coordinates (and shading parameters of the coordinates) of a horizontal span that corresponds to a particular object on a particular scanline, and 2) horizontal interpolation, for determining the individual pixel values for the pixels within the span. Vertical interpolation occurs for every active object on a scanline. Once the coordinates for the horizontal span and corresponding shading parameters have been determined, vertical interpolation is completed and horizontal interpolation begins. When all the pixels in the span have been shaded, horizontal interpolation for the span is completed. This shading process is embodied in step 304. Step 304 is repeated for all the objects on the active object list. Finally, a test is made to determine if the last scanline has been processed, step 305. If the final scanline has not been processed, the active object list is updated to reflect the active objects for the next scanline, step 306. The step 306 is generally identical in function to step 303. If the last scanline has been processed, the processing for that graphical image is complete. The steps 303–306 comprise the second pass.

An important distinction between the vertical interpolation process in the scanline approach and the object approach is that in the scanline approach portions of multiple objects are rendered at one time. Thus, appropriate storage is required to retain all the forward differencing information that will be used as all the objects are being interpolated. For example, if 10 units of storage are required for storing the forward differencing information for one object, 50 units of storage are required for storing the forward differencing information for 5 objects. Additionally, since forward differencing is being used, there is an inter-scanline dependence so that the scanlines must be processed in sequential order.

Scanline rendering provides benefits over object rendering that include eliminating the need for a frame Z-Buffer and a screen RGB Buffer, each of which usually are the size of the display.

A known system that utilized scanline rendering in combination with a pipelined object approach is discussed in the publication "Computer Graphics Principles and Practice Second Edition" by Foley, VanDam, Feiner and Huges published by the Addison Wesley Publishing Corporation at Pages 885–886. The system described provides separate processing units for creating an Object Activation Database, Active Object List, Visible Span Generation (i.e. Vertical Interpolation) and Pixel Shading (i.e. Horizontal Interpolation). However, the system as described did not provide for parallel pipelines.

A parallel pipeline system was described in the aforementioned "Computer Graphics Principles and Practice Second Edition" publication at Pages 899–900. The system described utilized a technique termed object-parallel rasterization. In this system multiple objects are processed in parallel.

The tradeoffs discussed above were often premised on an idea that it is desirable to minimize the number of computations that need to be performed. An example is the forward differencing technique for linear interpolation. In order to minimize division operations, a larger amount of data must be moved and stored through the system. With the maturation of semiconductor technology, the cost of circuitry to perform logic operations has decreased. Thus, it has become viable to design systems that utilize processing power and minimize memory. This is especially desirable when space is a consideration, since storage tends to take up a sizable amount of valuable space on an electrical circuit.

As described above, known rendering systems typically perform a high number of linear interpolations. It would be desirable to provide a method and means where these linear interpolations may be performed in an efficient manner.

Known high quality 3-D rendering systems are inherently expensive and incapable of incorporating new functionality without significant re-design of the inherent architecture of the rendering system. It would be desirable to provide a rendering system that is scalable to user needs. It is an object of the present invention to provide such a system.

It is a further object of the present invention to provide an interpolation means that does not present the bandwidth and data storage requirements associated with forward differencing based techniques.

It is a further object of the present invention to increase rendering performance of graphical images through the rendering of multiple scanlines, without requiring a multiple increase in data bandwidth requirements.

SUMMARY

A method and apparatus for generating pixel shading values in a computer controlled display system, is disclosed. Generally, the rendering apparatus is embodied in a rendering pipeline, where each stage of the pipeline performs a particular shading function. Pixel shading information is passed through each stage of the pipeline via set-up tokens and pixel interpolation tokens.

The present invention describes a method of shading pixels that provides for distributed interpolation of shading parameter values. The method of the present invention includes the steps of: deriving a pixel interpolation value from an object description, providing a first and second shading parameters and the pixel interpolation value to a first shading means, generating a first shading value for the pixel, providing second and third shading parameters and the pixel interpolation value to a second shading means and generating second shading values for the pixel.

DETAILED DESCRIPTION OF THE PREFERRED EMBODIMENT

A method and apparatus for rendering multiple scanlines in a computer controlled display system is described. In the following description, numerous specific details are set forth such as data structures, in order to provide a thorough understanding of the present invention. It will be apparent, however, to one skilled in the art that the present invention may be practiced without these specific details. In other instances, well-known circuits, control logic and coding techniques have not been shown in detail in order not to unnecessarily obscure the present invention.

Overview of the Computer System of the Preferred Embodiment

Figure 1:
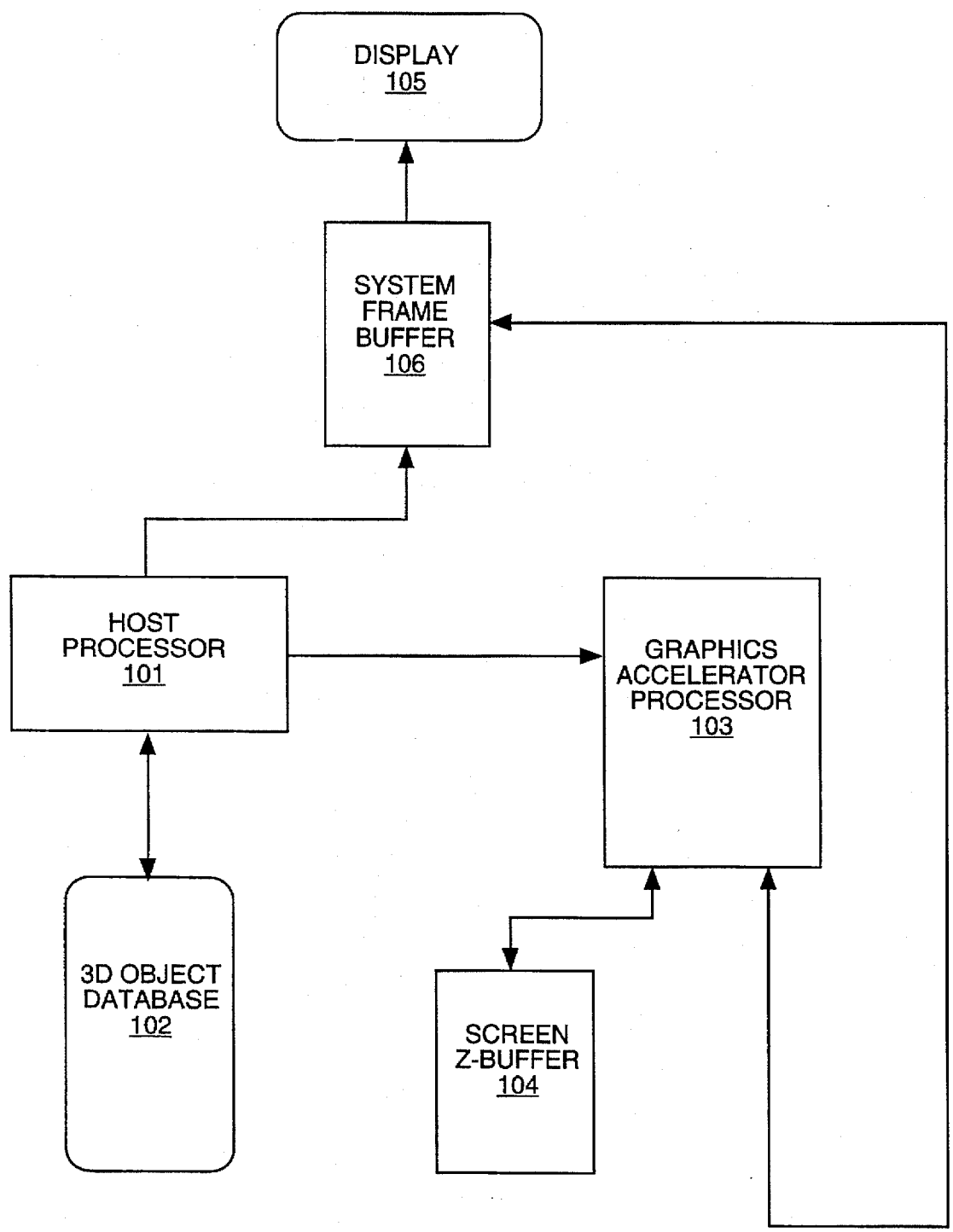
FIG. 1 is a schematic drawing of a prior art rendering system.
Figure 2A:
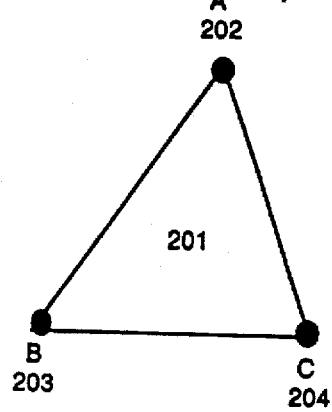
FIG. 2a illustrates the representation of an object as a triangle.
Figure 2B:
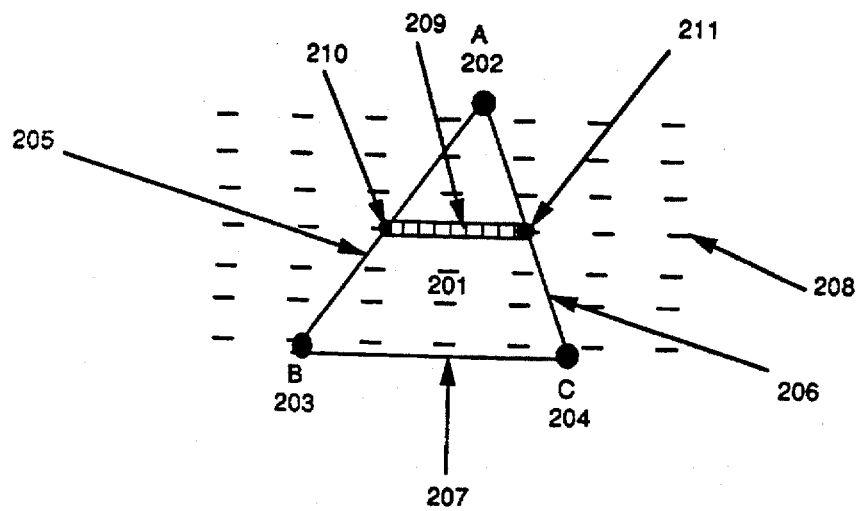
FIG. 2b illustrates a triangle mapped to a display screen.
Figure 2C:
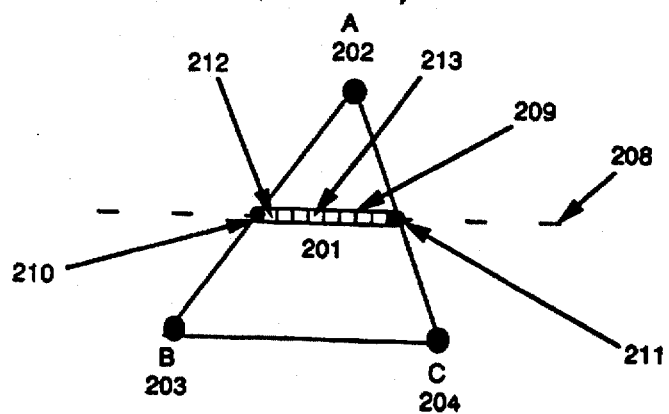
FIG. 2c illustrates pixels in a horizontal span of a triangle when mapped to a display screen.
Figure 3A:
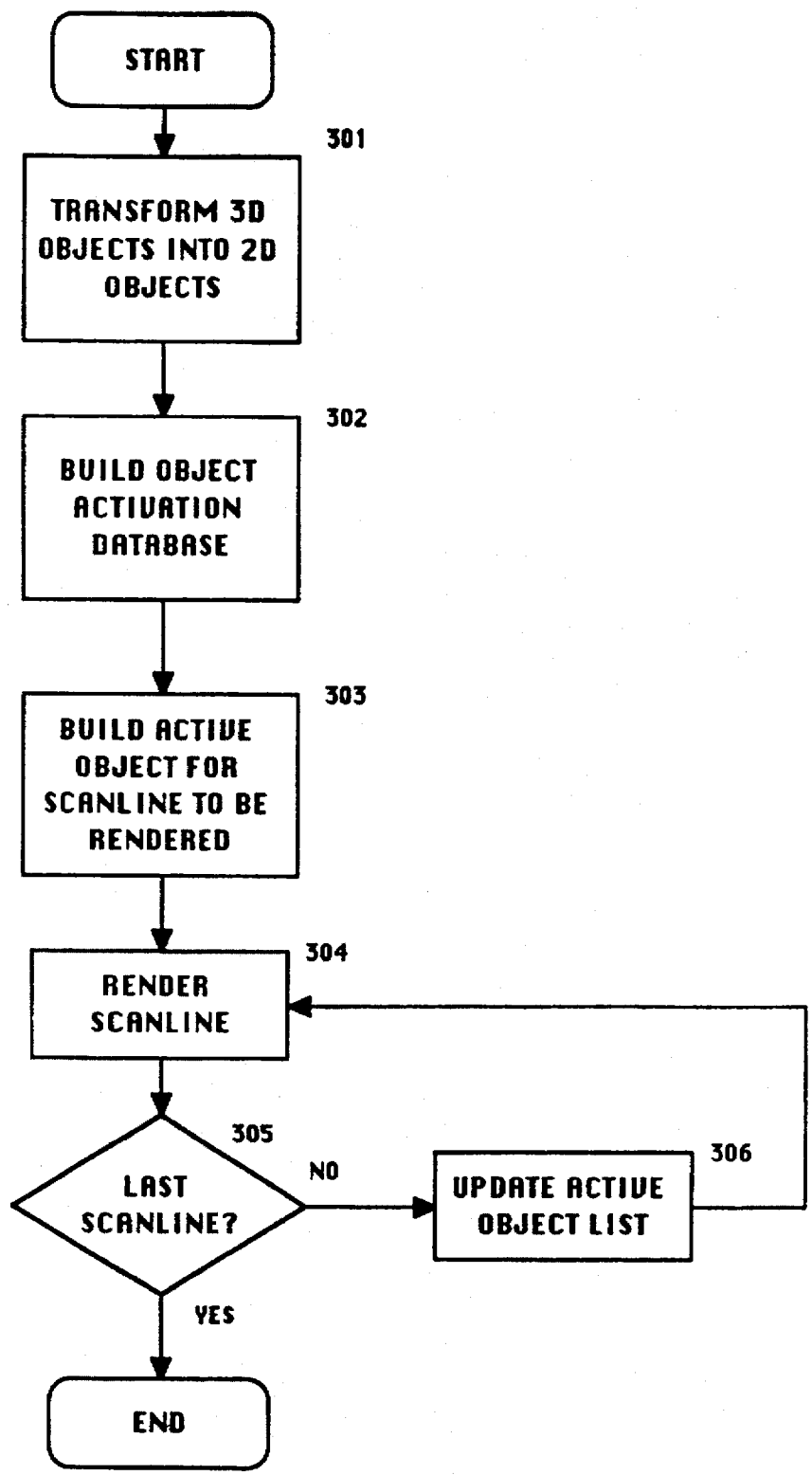
FIG. 3a is a flowchart illustrating a prior art scanline method for rendering a 3-D image.
Figure 3B:
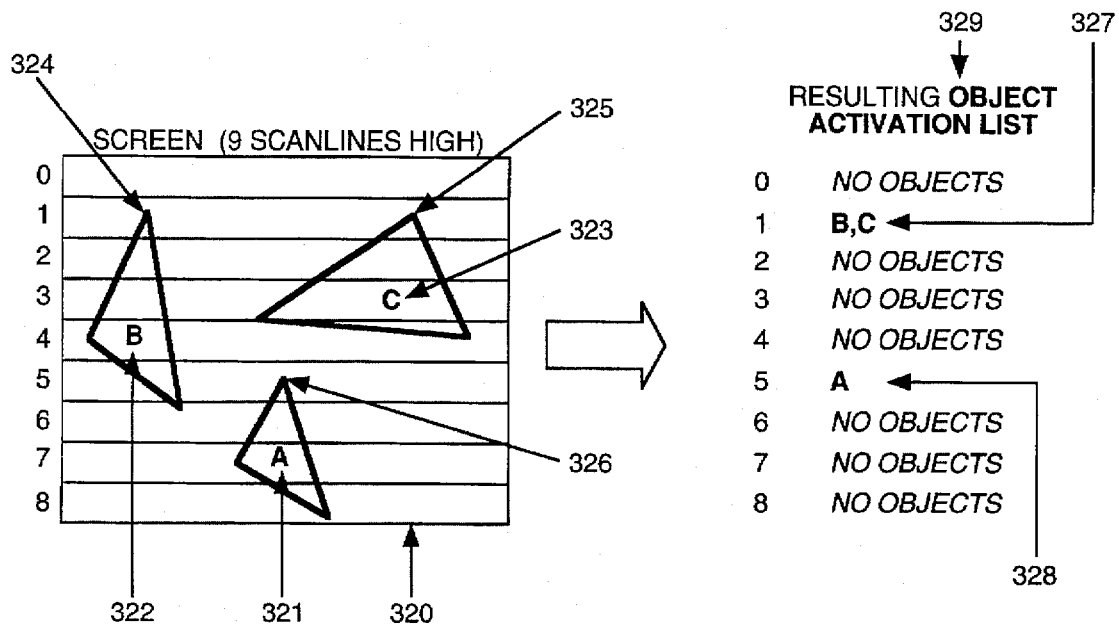
FIG. 3b illustrates an Object Activation Database as utilized in a prior art scanline method for rendering a 3-D image.
Figure 3C:
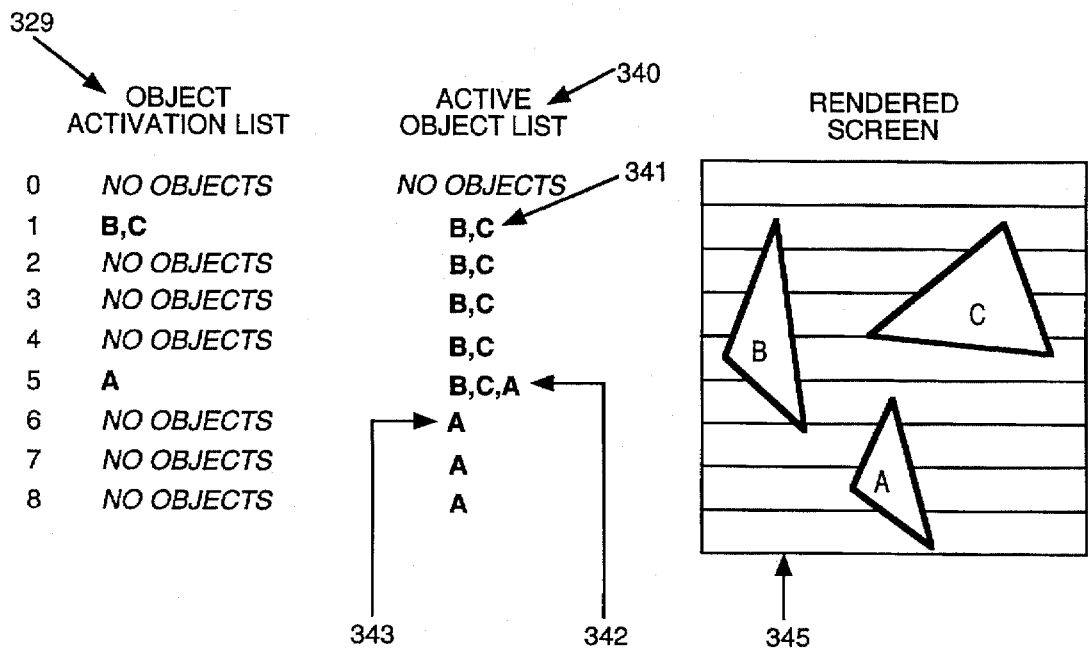
FIG. 3c illustrates an Active Object List as utilized in a prior art scanline method for rendering a 3-D image.
Figure 4:
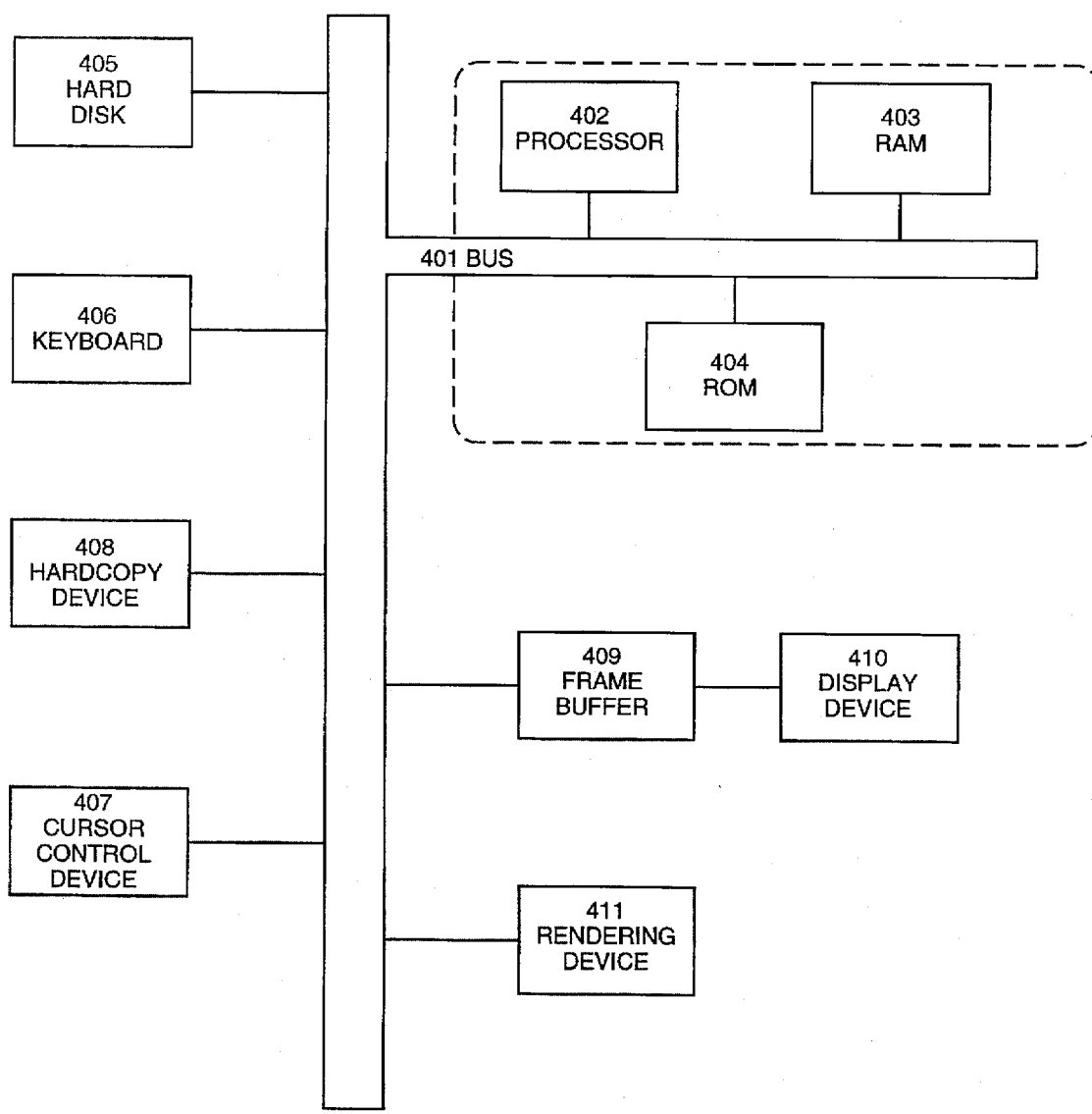
FIG. 4 illustrates a computer system as may be utilized by the preferred embodiment of the present invention.

The computer system of the preferred embodiment is described with reference to FIG. 4. The present invention may be implemented on a general purpose microcomputer, such as one of the members of the Apple® Macintosh® family, one of the members of the IBM Personal Computer family, or one of several work-station or graphics computer devices which are presently commercially available. In any event, a computer system as may be utilized by the preferred embodiment generally comprises a bus or other communication means 401 for communicating information, a processing means 402 coupled with said bus 401 for processing information, a random access memory (RAM) or other storage device 403 (commonly referred to as a main memory) coupled with said bus 401 for storing information and instructions for said processor 402, a read only memory (ROM) or other static storage device 404 coupled with said bus 401 for storing static information and instructions for said processor 402, a data storage device 405, such as a magnetic disk and disk drive, coupled with said bus 401 for storing information and instructions, an alphanumeric input device 406 including alphanumeric and other keys coupled to said bus 401 for communicating information and command selections to said processor 402, a cursor control device 407, such as a mouse, track-ball, cursor control keys, etc, coupled to said bus 401 for communicating information and command selections to said processor 402 and for controlling cursor movement. Additionally, it is useful if the system includes a hardcopy device 408, such as a printer, for providing permanent copies of information. The hardcopy device 408 is coupled with the processor 402 through bus 401.

Also coupled to the computer system of the preferred embodiment is a frame buffer 409 which is further coupled to a display device 410, preferably a display device capable of displaying color graphics images. The frame buffer 409 contains the pixel data for driving the display device 410. The display device 410 would be further coupled to a rendering device 411, also known as a graphics accelerator. Typically, such a rendering device 411 is coupled to the bus 401 for communication with the processor 402 and frame buffer 409. The preferred embodiment is implemented for use on a Macintosh computer available from Apple Computer, Inc. of Cupertino, Calif.

Figure 5:
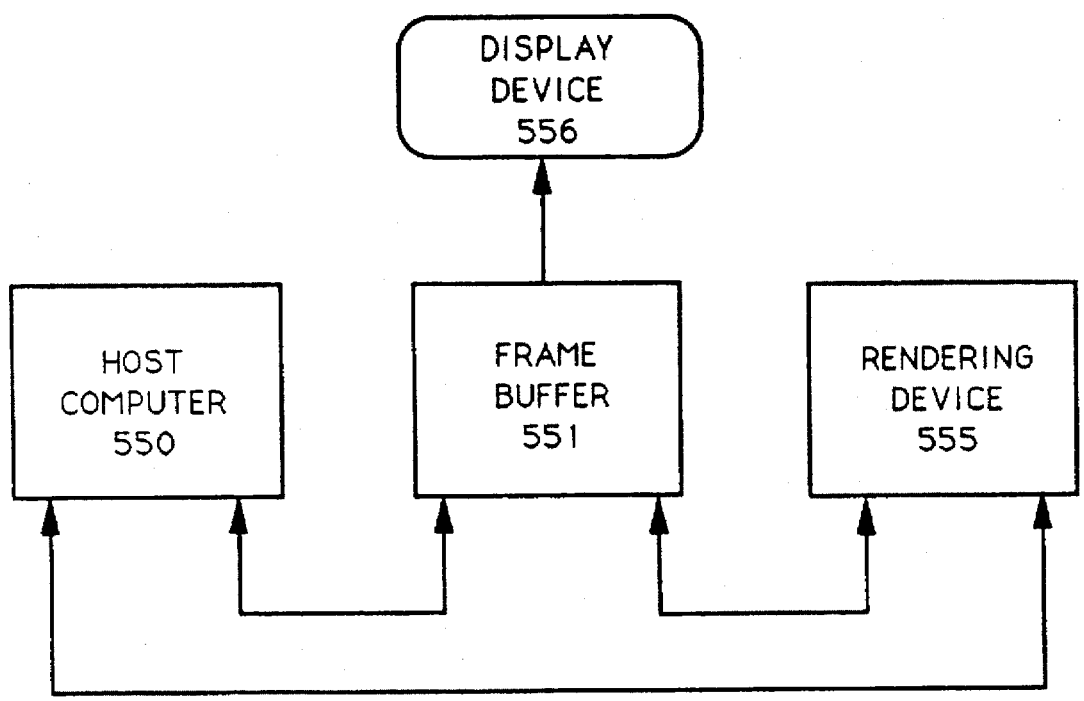
FIG. 5 illustrates a graphics accelerator coupled to a computer system and a display device as may be utilized by the preferred embodiment of the present invention.

FIG. 5 illustrates in more detail, a rendering device as coupled to a host computer system in the preferred embodiment. First, a host computer system 550 is coupled to a frame buffer 551 and a rendering device 555. The host/frame buffer coupling 552 is an optional coupling when the rendering device is installed. Such a coupling may be desirable in instances where the rendering device 555 is not being utilized, e.g. when the application being executed does not require the display of 3-D graphical images.

The host/rendering device coupling 553 is typically through a means such as the bus 401, described above with reference to FIG. 4. The rendering device/frame buffer coupling 554 is also typically over a DMA means. The information flowing over this coupling will typically consist of pixel data of images or scanlines that have already been rendered. Finally, the frame buffer 551 is coupled to the display device 556, wherein pixel data to drive the presentation of the graphical image is stored.

The rendering device of the preferred embodiment operates with display systems with fast raster support. Fast raster support refers to raster scan display systems where the frame buffer 551 can accept incoming scanlines of display data at high speed. Besides graphics applications, fast raster support is typically used for applications such as display of video data. Thus, the system of the preferred embodiment is compatible with systems that have support for video applications.

As will be described in more detail below, the preferred embodiment of the present invention utilizes a scanline approach to rendering. From a computer system design standpoint, the principle advantages in utilizing a scanline approach are the reduction of bandwidth between the graphics accelerator and the host/frame buffer, reduced requirements for low latency communication between the graphics accelerator and the host/frame buffer, and increased coherence of the data transferred from the graphics accelerator and the host/frame buffer. Moreover, for a given desired performance of the combined computer system and graphics accelerator, these advantages reduce both the cost of the computer system without the graphics accelerator, the cost of the graphics accelerator itself.

Shading Algorithm of the Preferred Embodiment

Before a pixel is shaded, it must be determined whether it is front most. As will be described in detail below, this occurs in the preferred embodiment through a scanline Z-Buffer algorithm. Once it is determined which pixels of an object are visible, a shading algorithm is used to determine pixel values (i.e. their color). Typically, the shading algorithm will take into account material properties of the object surface and the sources of light in the scene to determine the color of the pixel. In the preferred embodiment, a Phong Shading is performed at the endpoint vertices of a span while Gouraud shading is performed for the pixels across the span.

Material properties in the preferred embodiment include a diffuse RGB color, specular power (shininess), specular RGB color and surface normal. Light sources in the preferred embodiment include an infinite light source and an ambient light source. Finally, in the preferred embodiment, shading is based on a diffuse reflection model with the option of adding a specular reflection model.

The color of a particular pixel in an object can be most accurately calculated as the sum of the diffuse, specular, and ambient contributions for each of the color components. The specific diffuse color component, in this case the color red, is calculated by the formula:

$$\text{Diffuse Color}_r = L_{pr} K_{dr} (L \cdot N)$$

where $L_{pr}$ is the red color component of the (point) light source, $K_{dr}$ is the diffuse red component of the surface, L is the light vector, and N is the normal to the surface. All vectors are normalized. The calculation is repeated for each color component.

Specular reflection describes the light reflected from shiny surfaces. The specular color is determined by the product of the light and the specular color of the surface attenuated by the angle between the direction of the viewpoint and the reflection of light. Highlights are described by specular reflection. The red component of a the color of a pixel due to specular reflection is calculated by the equation:

$$\text{Specular Color}_r = L_{pr} K_{sr} (R \cdot V)^n$$

where $L_{pr}$ is the intensity of the red component of the (point) light source, $K_{sr}$ is the red component of the specular color, R is the reflection of the light vector off of the surface, and V is the reversed eye vector (the vector from the surface to the eye), and n is the specular reflection coefficient (i.e. the specular power). All vectors are normalized.

The ambient color contribution is calculated by the equation:

$$\text{Ambient Color}_r = L_{ar} K_{ar}$$

where $L_{ar}$ is the intensity of the ambient light source and $k_{ar}$ is the ambient color of the surface.

For each of the above color contribution components RGB, the calculations are repeated. The method of the preferred embodiment calculates pixel values in this fashion. However, as objects only have such RGB values defined at vertex points, interpolation techniques are used to determine values at points within the object. It is such an interpolation technique for determining pixel values that is implicit in the rendering architecture of the preferred embodiment.

Although the preferred embodiment utilizes a technique with Phong shading at the vertices coupled with Gouraud interpolations, it would be apparent that other shading techniques may be used. Such alternative shading techniques include, but are not limited to full Gouraud Shading or Torrence-Sparrow shading.

Rendering Architecture of the Preferred Embodiment

The rendering architecture of the preferred embodiment is premised on a scanline algorithm. As described with reference to prior art systems, the scanline algorithm renders an image by scanline. Briefly, the scanline algorithm is a two pass algorithm. The first pass is used to set up databases of information that are used to drive the actual scanline rendering process. In the first pass, a 2-D object is derived from each 3-D object in a 3-D object database. During this process, the scanline upon which the object would first be displayed (first in the sense of the order of drawing scanlines to the display device), i.e. become "active", is determined. This information is used to create an Object Activation Database, where the entries in the database define the objects that become "active" on a particular scanline.

In the second pass, the Object Activation Database is used to create a dynamic list of objects which are "active" on the scanline(s) currently being rendered. This list is called the Active Object List. The Active Object List is then provided to shading means which create the pixel values for the scanline(s) currently being rendered. The Active Object List is updated as objects become "active" or "inactive" on the scanline(s) to be rendered next.

It is known to those skilled in the art that an object may typically be represented by a data structure which contains coordinate information and shading parameter values. In the preferred embodiment, a triangle object is represented by 3 coordinate points, where each of the coordinate points has shading parameter values. The segments which interconnect the 3 coordinate points define the bounds of the triangle. Further in the preferred embodiment a quadrilateral object is definable. A quadrilateral will be similarly defined, except that it will define 4 coordinate points (each with corresponding shading parameter values). In the preferred embodiment, a quadrilateral may be provided to the rendering pipeline, but it would be converted into a pair of triangles for rendering (each utilizing 3 of the 4 coordinate points).

Figure 6A:
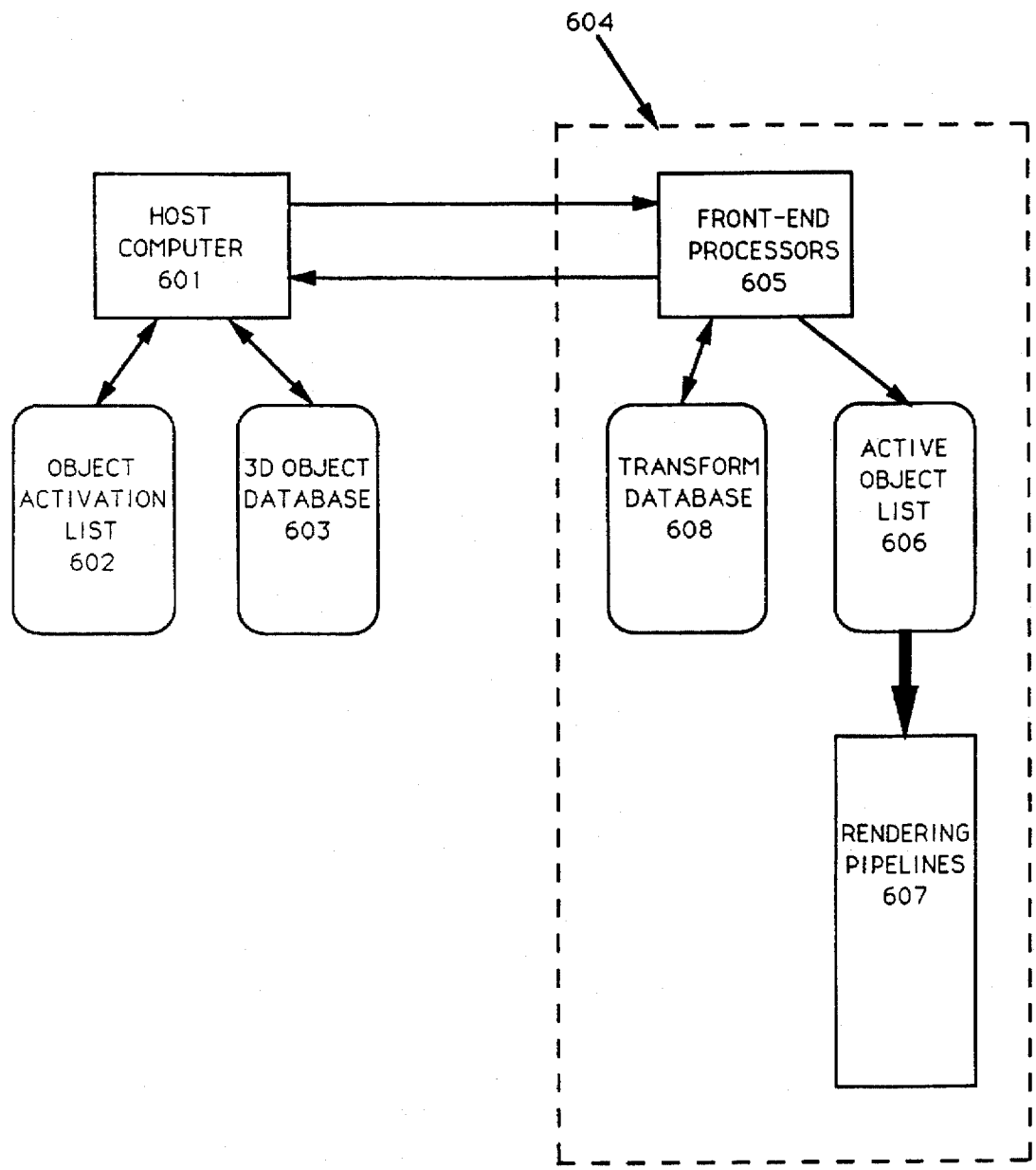
FIG. 6a illustrates a first graphics accelerator architecture as may be utilized by the preferred embodiment of the present invention.
Figure 6B:
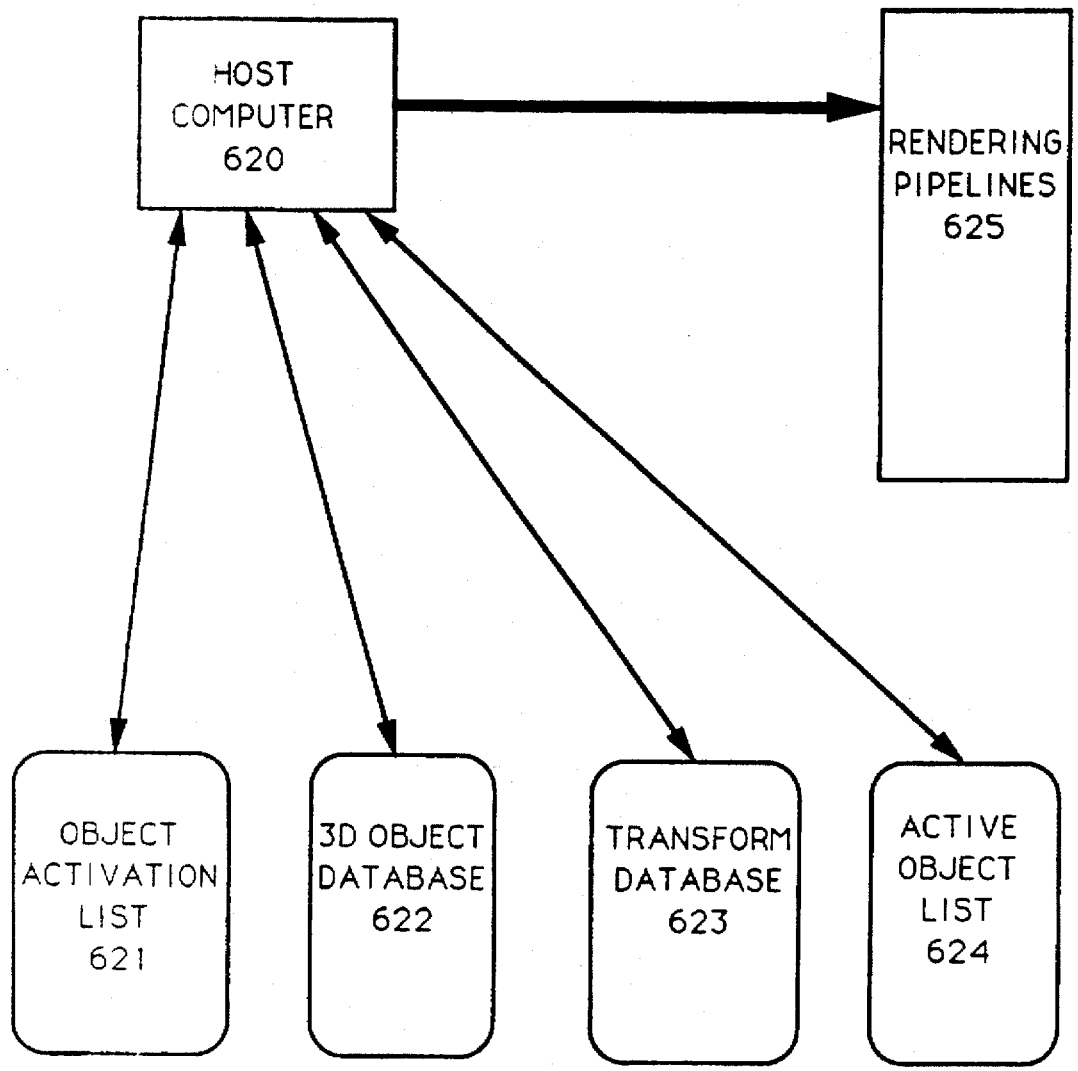
FIG. 6b illustrates a second graphics accelerator architecture as may be utilized by the preferred embodiment of the present invention.

Alternative systems hardware schematics as may be utilized by the preferred embodiment are illustrated in FIGS. 6a and 6b. Referring to FIG. 6a, a host computer 601, e.g. a microprocessor, is coupled to a graphics accelerator 604 so that certain functions in the rendering process are carried out by the host and the accelerator. The host computer 601 maintains a 3-D Object Database 603 and creates an Object Activation Database 602. As described above, the 3-D Object Database 603 contains a list of the 3-D objects which comprise the 3-D Graphical Image, while the Object Activation Database 602 contains a list for each scanline, of the objects which are first displayed on that scanline.

The graphics accelerator 604 is comprised of front-end processors 605 and rendering pipelines 607. The front-end processors 605 perform a plurality of functions in the rendering process. First, with respect to the first pass of the scanline algorithm, the front-end processors 605 perform dipping and transformation functions and provide the Host computer 601 with information for each object indicating the scanline on which the object first becomes active. With respect to the second pass, the front-end processors 605 receive 3D-object information from the Host computer 601 to create an Active Object List 606. The Active Object List 606 identifies objects which are "active" or to be drawn, on the particular scanline being processed. The front end processor 605 also provide control instruction to the rendering pipelines 607. Such control instructions are in the form of control tokens, and are discussed in greater detail below. The front end processors 605, are preferably floating point processors or Reduced Instruction Set Computer (RISC) processors.

Also illustrated in FIG. 6a is a transformation database 608. The transformation database 608 is used as a matter of convenience to resolve object accessing problems that occur due to the data structures used in creating the transformation matrices when transforming 3-D Objects to 2-Dimensional Objects.

Finally, the graphics accelerator includes one or more rendering pipelines 607. The rendering pipelines receive control information from the front-end processors 605 and the object information from the active object list 606 to perform the actual calculating of pixel values for each pixel in a scanline. The rendering pipelines 607 are discussed in greater detail below.

An alternative implementation is illustrated in FIG. 6b. The primary difference between this alternative implementation and that illustrated in FIG. 6b is the elimination of front-end processors and separate storage means for the transform database and Active Object List. Referring to FIG. 6b, the host processor 620 performs the functions of the front-end processors 605 of FIG. 6a. Likewise, transform database 623 and Active Object List 624 are coupled to and maintained by host processor 620. The host processor 620 then provides the contents of the Active Object List to one or more rendering pipelines 625, for rendering.

The embodiment illustrated in FIG. 6b is desirable in implementations where performance is sacrificed in relation to cost. As the embodiment in FIG. 6b utilizes fewer components then that in FIG. 6a, its total cost would be lower. However, as the host processor is called on to do more work, rendering performance will be impacted.

In whichever form, a graphics accelerator will typically be one or more printed circuit boards coupled to the computer systems. Coupling of the graphics accelerator was discussed above in reference to FIG. 5. In order to simplify the description of the the rendering pipelines of the preferred embodiment, the processor that provides the objects from the Active Object List to the rendering pipelines will be termed a control processor. In this context, the control processor would refer to the alternative configurations found in FIGS. 6a and 6b.

As will be described below, the rendering pipelines in the preferred embodiment utilize a means for directly interpolating pixel values and determining the x-coordinates of horizontal spans. As compared to prior art systems, the means of the preferred embodiment significantly reduces the amount of data storage for an Active Object List and significantly reduces the data bandwidth requirements.

With regard to the Active Object List, when utilizing traditional forward differencing techniques the Active Object List will contain all the shading parameter data for each active object. It is estimated that the direct evaluation method of the preferred embodiment would provide a 50% storage savings. This is caused by the requirement that 2n bits of precision are required for a value, in order to retain n bits of precision after an arithmetic function is performed. For example, forward differencing an n bit parameter requires storing a 2n current parameter value (pi) and a 2n parameter delta (pD), resulting in a parameter to be represented by 4n bits. Direct interpolation only requires the end-points, i.e. 2n bits of storage. As the number of parameters increases, the storage savings becomes more significant. In the preferred embodiment material properties parameters diffuse RGB, α (alpha or transparency), specular RGB, specular reflectivity ($N_s$), surface normal ($N_x$, $N_y$, $N_z$) and Z are interpolated and propagated through the pipeline. As shading functionality increases, the number or parameters required to describe the object will increase. Note that other parameters such as specular ambient and diffuse light parameters remain constant and thus need not be interpolated in the pipeline.

Correspondingly, the data bandwidth (or aggregate data flow) required to move the objects is decreased. As data must be moved from the Active Object List to the rendering pipelines, a reduced quantity of data results in a reduced bandwidth. Further, forward differencing requires reading Pi-1 and Δp for 4N bits, then writing back Pi to the Active Object List (another 2N bits) for a total of 6N bits. As described above, in direct evaluation, only 2N bits will be transferred to/from the Active Object List. This results in a 3X savings in the required Active Object List bandwidth of a system that directly interpolates the end-points. Moreover, the unidirectional data flow of direct evaluation also simplifies system design.

It should be noted that in the preferred embodiment the graphics acceleration may directly access the system frame buffer. Thus, inherent in the preferred embodiment is a Direct Memory Access (DMA) means which will allow the graphics accelerator to scanout rendered scanlines directly to the system frame buffer.

Using direct evaluation also reduces the computation necessary to set-up the active object list as slope divisions and parameter delta calculation (i.e. the ΔP) are not necessary. These steps (performed by the front-end processors) are often expensive because of the care taken to avoid introducing error in the forward differencing calculation.

A desirable effect provided by direct evaluation is that it facilitates the rendering of multiple scanlines in parallel. Because the primitives in the active list contain no information dependent on vertical position, the same data can be fed into multiple pipelines, each configured to perform vertical interpolation for a different scanline. By contrast, the forward differencing algorithm changes the primitive description every scanline, so it is difficult to use the same data to drive the rendering of multiple scanlines.

Description of the Rendering Pipeline

The rendering pipeline of the preferred embodiment is designed to generate one shaded pixel per pipeline clock cycle. As described above, the rendering in the preferred embodiment utilizes the scanline approach. Using traditional forward differencing linear interpolation techniques, the rendering of multiple scanlines simultaneously is made difficult because of the inter-scanline dependencies. The rendering pipeline of the preferred embodiment avoids such difficulties through the use of multiple parallel pipelines and direct evaluation of coordinate and parameter values.

As described above, forward differencing requires high data bandwidth. During the shading of pixels, i.e. horizontal interpolation, a given pixel typically will require over 200 bits of data to be transferred for each shading function. A known technique for minimizing data bandwidth problems is to provide for fast interconnection between components. However, this may create other problems such as synchronization and control. In connection with direct evaluation, the preferred embodiment further minimizes the required bandwidth through direct and distributed evaluation of a pixel interpolation token. This negates the need to send all the shading data required for a pixel down the pipeline. Endpoint values for all parameters are first sent whereupon an interpolation weight need only be provided for each pixel. Direct and distributed evaluation will be discussed in greater detail below with respect to horizontal interpolation.

Operation of the Rendering Pipelines

Data and control information is transferred between various stages in the rendering pipeline area as "tokens". "Tokens" as utilized in the preferred embodiment, refer to a fixed structure for sending and receiving data and control information. In any event, prior to receiving objects, the rendering pipelines must be provided with setup information, to define the rendering functions that will be performed. In the preferred embodiment, this occurs by propagation of a global mode setup token through the pipeline. The global mode setup token is described in greater detail in the section entitled Tokens. Briefly, the global mode setup token is generated by the control processor (i.e. FIG. 6a or the host processor per FIG. 6b) and is used to enable diffuse or specular shading, shadowing and a transparency mode.

Once the pipeline has been set-up, the rendering pipelines may receive objects to be rendered. First, a Direct Input Stream Token is sent to the pipelines to designate which rendering pipelines will receive the forthcoming input stream. For objects, all the rendering pipelines may receive the input stream. However, if it is an instruction to cause a particular processing unit to perform a particular function, the rendering pipeline can be designated as appropriate by the Direct Input Stream Token. Next, the objects are sent down to the pipelines in corresponding DRAW instructions. A DRAW instruction merely indicates to the pipeline that an object or more precisely, a span, is to be rendered. The DRAW instruction is followed by data describing 2, 3, or 4 vertices. Loading 4 vertices causes an independent quadrilateral to be drawn. For a quadrilateral to be drawn; the vertices are loaded in the order V0 . . . V3. A quadrilateral is drawn as two triangles. A triangulation field in the DRAW command indicates along which axis to split the quadrilateral. Loading 3 vertices causes the triangulation field to be ignored.

Loading 2 vertices indicates that a strip of connected quadrilaterals is being drawn. A quadrilateral strip is always begun with a detached quadrilateral loading all 4 vertices. The immediately following DRAW command reloads V0/V1, and causes 2 more triangles to be drawn, triangulated as indicated by the triangulation field, and sharing previously loaded V2/V3. The subsequent DRAW reloads V2/V3, sharing the previous V0/V1, and so on, always swapping which 2 vertices are loaded. The triangulation field allows the triangulation axis of each quadrilateral to be specified independently; because the vertex order is swapped for every quadrilateral, leaving the triangulation bit constant will result in the crosshatch triangulation pattern.

Figure 7:
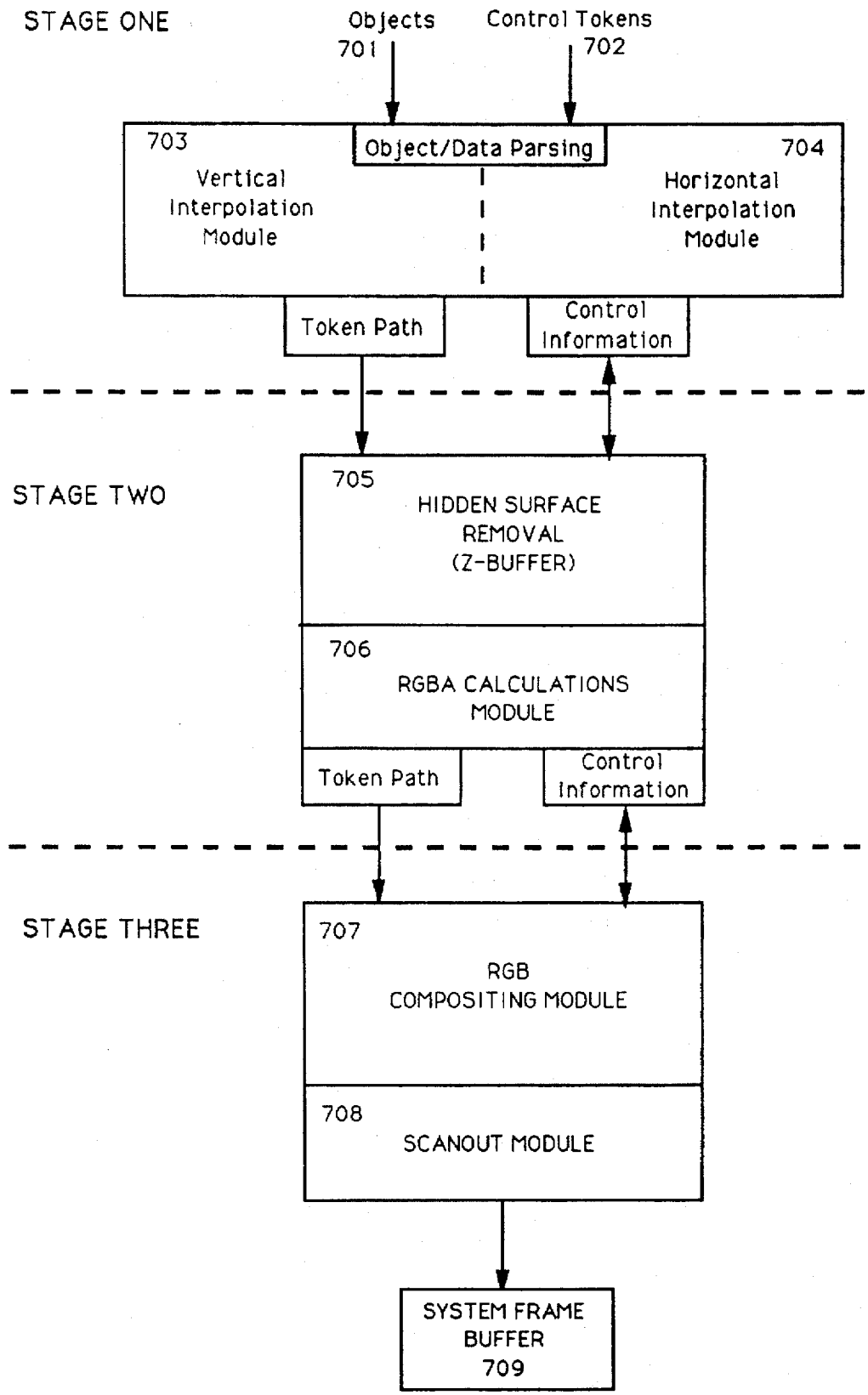
FIG. 7 illustrates a graphics pipelines as may be utilized by the preferred embodiment of the present invention.

FIGS. 7 and 8a–8c describe operation of the rendering pipelines as an object is being rendered. Referring to FIG. 7, in the preferred embodiment the rendering pipeline, such as pipeline 607, is comprised of at least 3 stages. Stage one derives interpolation values, spans and pixels for the objects. Stage two performs hidden surface removal, shadow functions and performs ambient color calculations. In Stage three, a compositing function is performed as well as scanout of a rendered scanline. As each stage provides for standard passing of information and synchronization of operation within the pipeline, additional shading functions, such as texturing, may be added between stages two and three. In the preferred embodiment, Gouraud shading is preformed. If alternative shading methods are desired, such as Phong shading, additional stages between state two and three, may be included. Each of the stages is discussed in greater detail below.

Stage One

In Stage 1, object descriptions (hereinafter objects) 701 from an active object list and control tokens 702 are input into a stage 1 processing means. The stage 1 processing means acts as a pre-processor, for receiving and preprocessing the objects for rendering. A first function performed in stage one is vertical interpolation (via vertical interpolation module 703). A primary purpose of vertical interpolation is to identify the X-coordinates for horizontal spans corresponding to the active objects in the scanline being processed. The vertical interpolation module also generates set-up tokens describing the span and it's shading parameters. The set-up tokens are forwarded to succeeding stages in the pipeline. A second function performed is setup for horizontal interpolation (via horizontal interpolation module 704). Horizontal interpolation is the process by which pixels in a span are shaded. The horizontal interpolation process is distributed in that separate stages perform separate shading functions. The horizontal interpolation module 704 generates Pixel interpolation tokens for each pixel in the span.

Figure 8A:
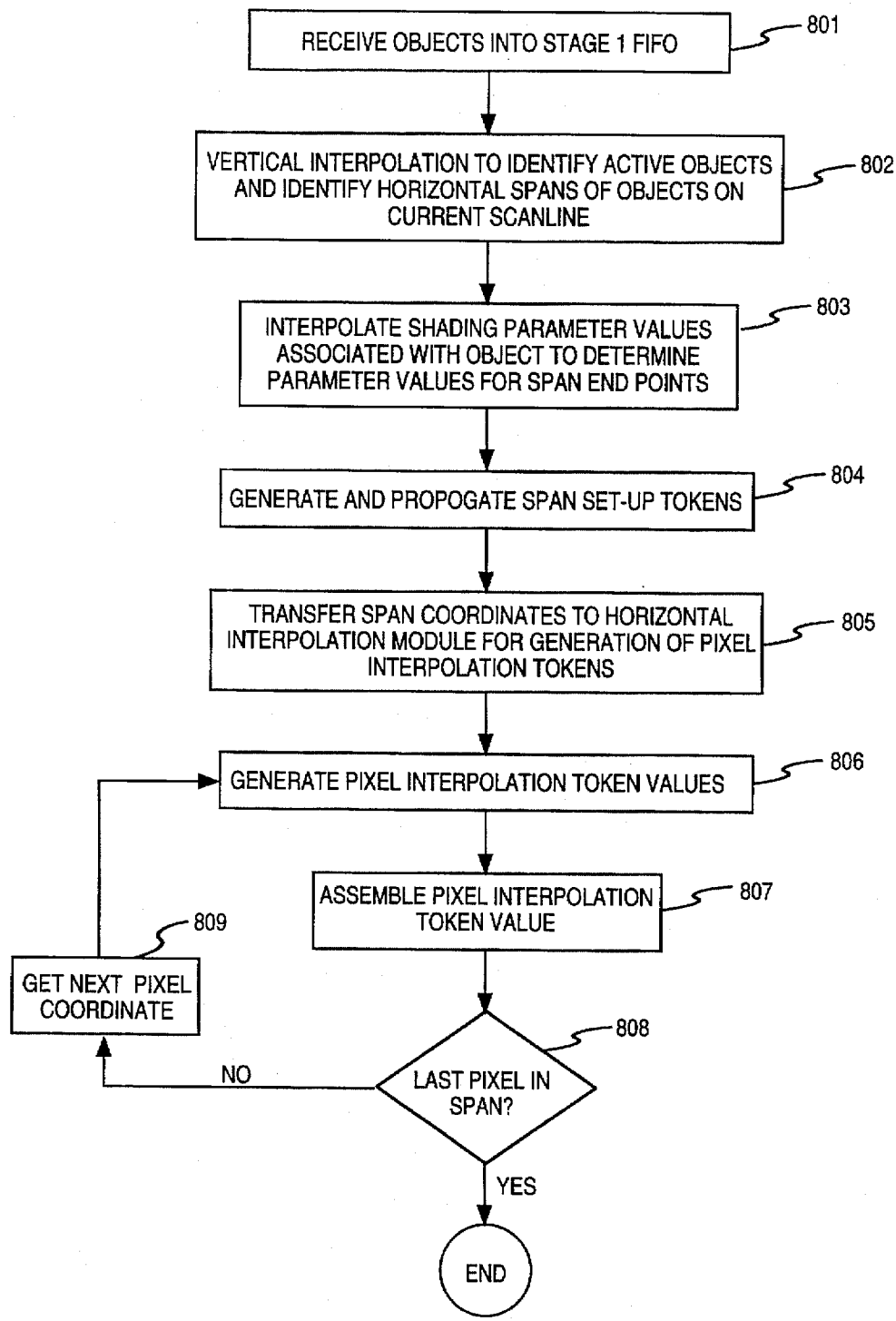
FIG. 8a is a flowchart of the flow of operation for a stage 1 (of FIG. 7) as may be utilized by the preferred embodiment of the present invention.

FIG. 8a describes stage 1 processing in more detail. First, the objects from the active object list, corresponding to the identified scanline, are sent to the stage one input, step 801. It should be recalled that the data representing the objects include the coordinates of the vertices and shading parameters at the vertices. As the objects are sent down in a "burst" mode, a First In First Out (FIFO) queue is provided which stores the objects prior to their being processed. The stage one processing unit may suspend transfer of objects via provided control signals. Once the objects are input into the pipeline, they are serially processed within Stage One (but the processing of an individual object may occur in parallel). The first step for pre-processing an object for the pipeline, is vertical interpolation to identify a horizontal span of the object, step 802. A horizontal span is identified by the end coordinates representing the portion of the object that is displayable on the scanline being processed. As the scanline being processed represents a Y-coordinate, the X-coordinate is identified by determining the intersection point of a scanline and a corresponding active edge. Following the calculation of the span coordinates, corresponding parameter values are then generated for the span end-points, step 803. This is accomplished by linearly interpolating the endpoints of the active edges with respect to the scanline being processed. The details of vertical interpolation are described in more detail below.

Next, span parameter set-up tokens are generated and sent down the pipeline, step 804. Such span parameter set-up tokens contain the RGB values or Z-values for the endpoints of the span that were generated in step 803. It should be noted that certain tokens will only be used by certain successive stages. For example, stage 3 does not use Z-value set-up tokens. If a particular stage does not require the information contained in a particular token, that token will be ignored.

Next, setup for horizontal interpolation of the span is performed. Horizontal interpolation refers to the interpolation of the parameter values of the end-points of a span, across the pixels in the span. The set-up for horizontal interpolation requires transfer of the coordinate points of the span, step 805, and the generation of a pixel interpolation token, step 806. A pixel interpolation token consists of the pixel coordinates and a pixel interpolation weight value. The pixel coordinates are determined by simply counting across the span starting at the left most endpoint on the span. Generation of the pixel interpolation token is described in greater detail below with respect to horizontal interpolation.

Next, the corresponding Pixel Interpolation token is assembled and sent down the pipeline, step 807. A check will be made to determine whether it is the last pixel in the span, step 808. If it is not the last pixel in the span, the next pixel coordinates are generated (typically by counting to the next horizontal pixel value), step 809, and the process repeats starting at step 806.

The steps 802–809 will be repeated for all the objects received in the FIFO. As there may be some overlap in processing, i.e. more than one object may be processed through the pipeline at one time, there is typically no check after the generation of a pixel interpolation token to see if there are any more objects in the object FIFO. Moreover, some of the steps may overlap. For example, the generation of span parameter values may occur during the horizontal interpolation set-up processing.

Stage Two

Referring back briefly to FIG. 7, a first function of Stage Two is hidden surface removal (via hidden surface removal module 705). The hidden surface removal module 705 utilizes a Z-Buffer algorithm to eliminate pixels that will not be shaded, because they are "behind" other objects (i.e. not front most). Shadow analysis, to further eliminate pixels that will not be shaded, may also be performed in conjunction with Z-analysis. The shadow analysis is also performed by the hidden surface removal module 705. Stage 2 also performs an ambient color calculation on the visible pixels (via RGBA module 706), and places these values into the Pixel Interpolation Token. The output of stage two are the front most, non-shadowed spans, as well as tokens that are flowing unprocessed through the pipeline, e.g. null tokens.

Figure 8B:
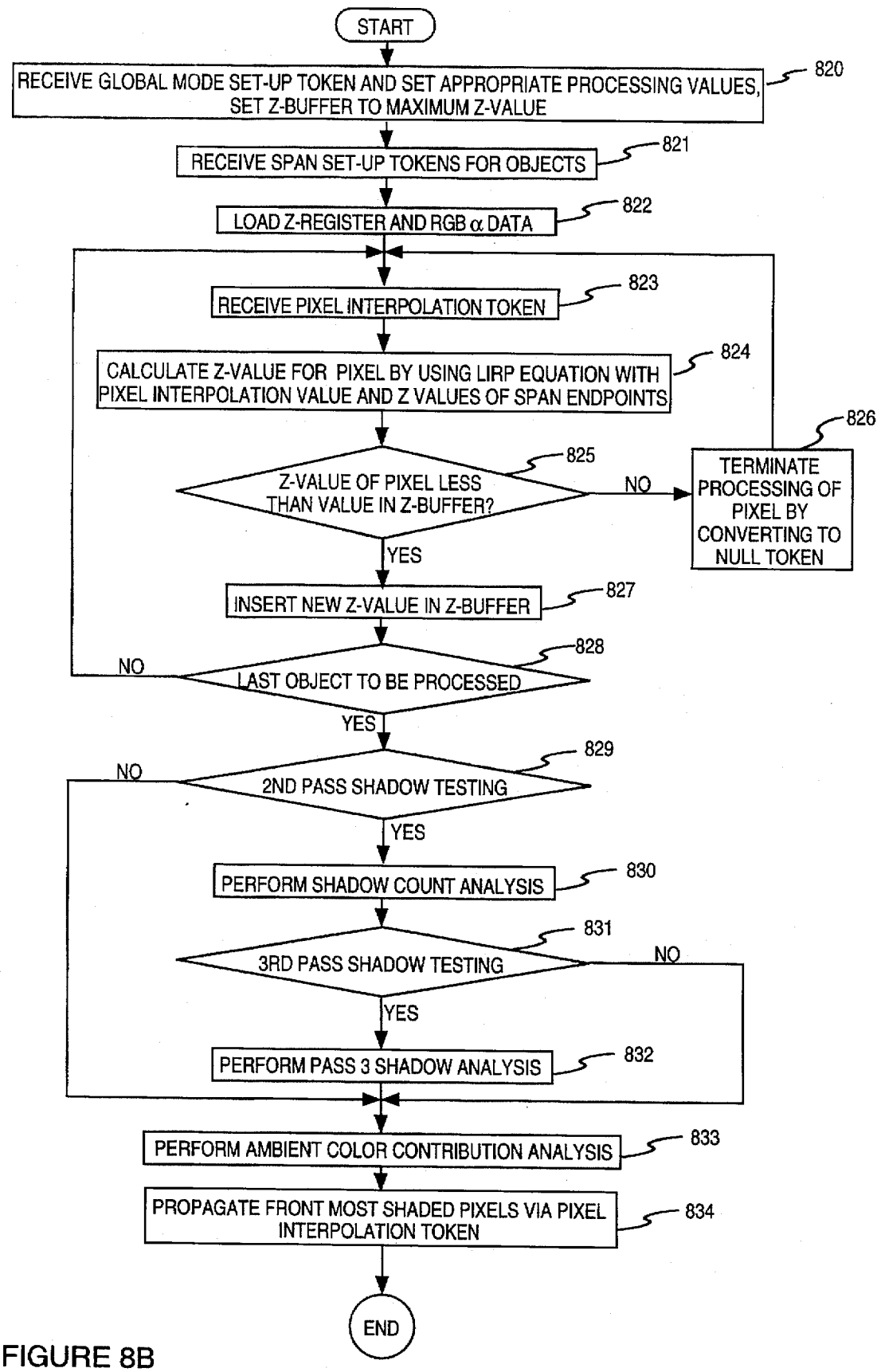
FIG. 8b is a flowchart of the flow of operation for a stage 2 (of FIG. 7) as may be utilized by the preferred embodiment of the present invention.

FIG. 8b illustrates the steps performed in Stage Two. First, prior to receiving any object data, the stage two processing unit receives the Global Mode set-up token, step 820. The Global mode set-up token is used to set appropriate processing criteria for the desired rendering functionality. Next, the span parameter set-up tokens generated in stage one are received, step 821, and the relevant data (i.e. Z and RGBα values) is loaded into registers embodied within the processing unit, step 822.

Stage 2 processing begins when a Pixel Interpolation token is received, step 823. First a corresponding Z-value for the pixel is calculated, step 824. The Z value for the pixel is calculated by directly evaluating a linear interpolation (LIRP) function, using an interpolation weight value contained within the pixel interpolation token. When comparing Z-values, a lower Z-value means that the object is closer to the viewer. In this context, this means that a first object with a higher Z-value than a second object, will be behind and thus hidden by the second object. It should be noted that the Z-buffer will always be initialized to a maximum Z-value so that it will have a valid value to compare incoming Z-values with. This horizontal interpolation of the Z-values of the various pixels in the span is described in more detail below. Once the Z-value of the pixel has been determined, a comparison is then made of the Z value for the pixel with a Z value at the corresponding pixel location in the Z buffer, step 825. If the Z value of the pixel is greater than the value in the corresponding location in the Z buffer, processing of the pixel is terminated, step 826. Termination of processing of the pixel involves converting the corresponding token into a null token, whereupon it will flow through the pipeline unprocessed. If the value is less than or equal to the value in the Z buffer, then the new lower Z-value is returned to the Z-buffer, step 827 and a check for the last object is made, step 828. If it is not the last object, the next pixel interpolation token is received, step 823. If it is last object then it must be determined if pixel elimination because of shadowing will be performed. A first check to see if Second pass analysis will be performed, step 829. This second pass is performed if the shadow count flag in the global mode setup token is set. If yes, second pass analysis is performed, step 830, otherwise it is determined if third pass shadow testing is to be performed, step 831. If yes, third pass analysis is performed, step 832. The aforementioned shadow analysis is described in greater detail below. In any event, the next step will be to determine the RGB ambient color contributions for the pixel, step 833. This simply involves linear interpolation of the pixel based on the endpoint parameter values of the corresponding span. Once this is performed, the RGB values are placed back into the pixel interpolation token and the token is propagated to the next stage.

Stage Three

In Stage Three, a compositing function is performed (via RGB composition module 707). Compositing involves the generation of pixel values due to transparency of objects. This will typically occur when multiple objects have identical Z- values. A transparency value that is associated with an object is termed α. The a value represents the percentage of the final color value that the corresponding object contributes. For example, an object with an α of 50, will contribute 50% of the final color pixel value. In the preferred embodiment two types of transparency calculations are performed, additive transparency and filtered transparency. In additive transparency, the existing values are simply added to the incoming color value after being scaled by α.

In filtered transparency the new color value is linearly interpolated with the old color value to generate the filtered color value. In filtered transparency, the Relative Weight used for the interpolation function is the value provided with the incoming color data, i.e. α.

Finally, in the stage 3 a scanline buffer in scanout module 708 is used to collect the final values of the pixels for the scanline being processed. Once all the objects in the scanline have been processed, the contents of the scanline buffer is transferred to the system frame buffer 709.

Figure 8C:
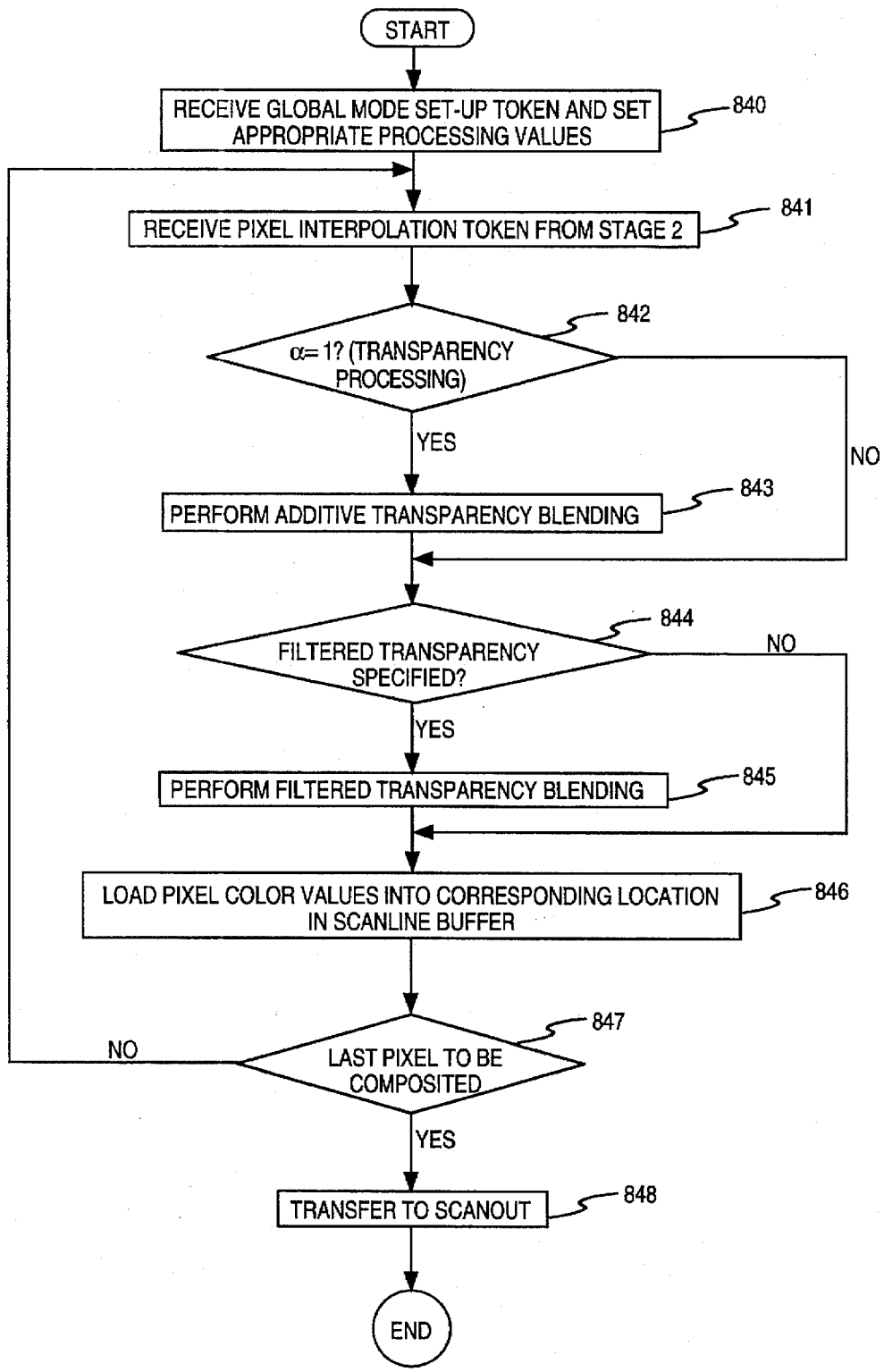
FIG. 8c is a flowchart of the flow of operation for a stage 3 (of FIG. 7) as may be utilized by the preferred embodiment of the present invention.

FIG. 8c further illustrates Stage Three processing in the rendering pipeline. As in Stage Two, the global mode setup token received, step 840, and the appropriate processing parameters are set. In this case the processing parameters will dictate which of additive or filtered transparency mode will be used. Next, Pixel Interpolation tokens are received, step 841. The first step is to determined if transparency processing will not be performed by checking if α=1, step 842. If α=1, then the pixel color values will be loaded into the scanline buffer, step 846 (since the incoming pixel shading values provide 100% of the blended color value). If transparency processing has been specified, additive transparency is performed, step 843. Next, it will be determined if filtered transparency will be performed, step 844. If yes, filtered transparency blending is performed, step 845. Once the blending has occurred and a new color value has been generated or if now filtered transparency blending is performed, the new pixel color values is loaded into the corresponding location in the scanline buffer, step 846.

It is then determined if the final pixel has been processed, step 847. If the last pixel has not been processed, the next pixel interpolation token is received, step 841. If the last pixel in the last span has been processed, the contents of the scanline buffer is transferred to the system frame buffer via a scanout, step 848. As described above, it is the system frame buffer that is used to drive the display means. It should be noted that in the preferred embodiment, the scanline buffer is double buffered. This will allow the contents of the scanline buffer to be transferred to the frame buffer while a new scanline is being processed.

Vertical Interpolation

Figure 9:
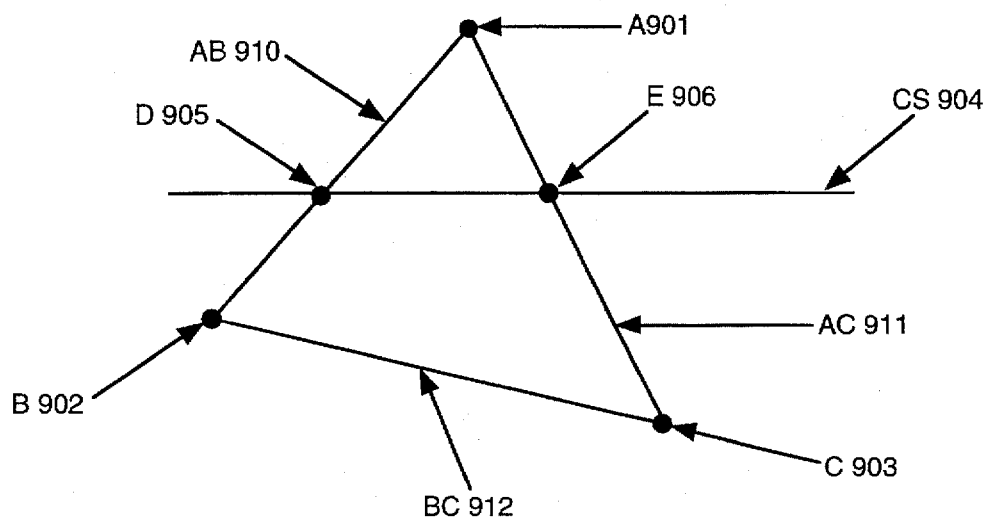
FIG. 9 illustrates an example of Vertical Interpolation in the preferred embodiment of the present invention.

As defined above, vertical interpolation is the process by which the X-coordinates of the end-points on a span are determined. A span is the portion of an object that is visible on the scanline being rendered. The vertical interpolation of the preferred embodiment is achieved by a direct solution method that uses object description information and the identify of the scanline. Vertical interpolation for an object on a scanline being rendered is illustrated with respect to FIG. 9. Referring to FIG. 9, the coordinate points for the vertices of the object are A(Xa,Ya) 901, B(Xb, Yb) 902 and C(Xc,Yc) 903. The scanline being processed is Ycs 904.

In this example, the coordinate points for the object being processed are: Xa=60, Ya=20, Xb=40, Yb=150, and Xc=80, Yc=180. The current scanline Ycs=100. By the process of Vertex Sort (which is described in greater detail below), the active edges of the object for Ycs are determined to be AB 910 and AC 911. An active edge is merely one that intersects the current scanline. An edge is considered active if it satisfies the equation:

$$Y\text{-top} < Y \text{ current scanline} <= Y\text{-bottom},$$

where the Y coordinate increases from top to bottom. For the edge AB 910 Y-top=Ya=20, and Y-bottom=Yb=150; so that 20<100<=150 and the equation is satisfied. For the edge AC 911 Y-top=Ya=20, and Y-bottom=Yc=180; so that 20<100<=180 and the equation is satisfied. With respect to edge BC 912 Y-top=Yb=150, and Y-bottom=Yc=180; so that the equation 150<100<=180 is not satisfied and edge BC 912 is not an active edge.

The X-coordinate for the points where each scanline intersects an active edge is calculated by first determining a relative weight w for the edge on scanline Ycs using the formula:

$$W = (Y_{cs} - Y_0)/(Y_n - Y_0)$$

where $Y_{cs}$ is the current scanline, $Y_0$ is the highest scanline ordinate value (lowest in numerical value) of the active edge and $Y_n$ is the lowest scanline ordinate value (highest in numerical value) of the active edge.

The X-coordinate is then determined by directly evaluating the linear interpolation equation:

$$X = X_0(1-W) + X_1 W$$

where $X_0$ is the leftmost horizontal coordinate of the active edge and $X_1$ is the rightmost coordinate of the active edge.

With respect to FIG. 9, the active edge AB 910 intersects the current scanline 904 at point D $(X_0, Y_{cs})$ 905. The active edge AC intersects the current scanline 904 at point E $(X_1, Y_{cs})$ 906. For the point D 905, the relative weight is $$\begin{aligned} W &= (Ycs - Ya)/(Yb - Ya) \\ &= (100 - 20)/(150 - 20) \\ &= 80/130 \\ &= 8/13. \end{aligned}$$

Inserting this into the linear interpolation equation, the X-coordinate is determined as $$\begin{aligned} X_0 &= Xb(1-W) + Xa(W) \\ &= 40(5/13) + 60(8/13) \\ &= 200/13 + 480/13 \\ &= 680/13 \\ &= 524/13 \end{aligned}$$

which is rounded to 53. Thus, the coordinates for point D 905 are (53, 100).

For the point E 906, the relative weight is $$\begin{aligned} W &= (Ycs - Ya)/(Yc - Ya) \\ &= (100 - 20)/(180 - 20) \\ &= 80/160 \\ &= 1/2. \end{aligned}$$

Inserting this into the linear interpolation equation, the X-coordinate is determined as $$\begin{aligned} X_1 &= Xa(1 - W) + Xc(W) \\ &= 60(1/2) + 80(1/2) \\ &= 30 + 40 \\ &= 70 \end{aligned}$$

Thus, the coordinates for point E 906 are (70, 100).

When using such interpolation techniques, fractional components may arise due to the divisions required in achieving the W value. This may result in the rendering of pixels on the boundaries between two triangles twice, or missing pixels to be rendered. To account for such fractional components, a rule is adopted that pixel centers in both the X and Y directions are at X.50 and Y.50, respectively. With respect to FIG. 9, the pixel center for the point A 901 (60, 20) would be (60.50, 20.50). Further, a pixel is covered if the equation $$\min < \text{pixel co-ordinate} <= \max$$

is satisfied. In order for a point to be included in a horizontal span, the point coordinates are compared to the X-coordinate characteristics of the endpoints of the span and the Y-coordinate characteristics endpoints of the active edges for the object the span is associated with. Referring again to FIG. 9 for a point to be within the horizontal span defined by the points D 905 and E 906, the following criteria must be met:

For the X-Coordinate:
$53.50 < X_n <= 70.50$; and for the Y-Coordinate:
$100.50 < Y_n <= 100.50$.

By using < (less than) for comparison on one side and >= (greater than or equal to), the rendering of pixels on the boundaries between two triangles twice, or missing pixels, is avoided. Here the Y coordinate value will typically be satisfied because it refers to the scanline being rendered.

Generation of Shading Parameters for Span Set-up Tokens

The shading parameter values, i.e. the RGB, Z and $\alpha$ values, at each of the span endpoints are calculated in the same manner as the X-coordinate. Since W has been previously calculated, it is simply a matter of inserting the provided shading parameter values at the endpoints of the active edges into the linear interpolation function. Referring back to FIG. 9, the endpoints D 905 and E 906, the provided parameter values at each of the endpoints of the active edges, i.e. points A 901, B 902 and C 903, are provided as input to the linear interpolation function. For example, the shading parameters at endpoint D 905 may be calculated using the linear interpolation equation as $P_D = P_B(1-W_D) + P_A(W_D) = P_B(5/13) + P_A(8/13)$; where $P_A$ is the provided parameter value at point A 901, $P_B$ is the provided parameter value at point B 902 and $P_D$ is the interpolated parameter value at point D 905. Similarly, the shading parameters for the endpoint E 906 may be calculated using the linear interpolation equation as $P_E = P_A(1-W_E) + P_C(W_E) = (P_A+P_C)/2$; where $P_A$ is the provided parameter value at point A 901, $P_C$ is the provided parameter value at point C 903 and $P_E$ is the interpolated parameter value at point E 906. These shading parameter values at the endpoints of the span are calculated and propagated through the rendering pipeline through corresponding span set-up tokens.

Generation of a Pixel Interpolation Token

As described above with respect to Stage 1, pixel interpolation tokens are generated after span coordinates have been defined. These end-points, say Xa and Xb, are received by the Horizontal interpolation module, which immediately compares them to determine which is leftmost. It is assumed that Xa is leftmost. If Xb is leftmost, Xa and Xb are swapped. In this scheme, an interpolation weight value W=0 reference refers to the left end of the span (i.e. Xa). A W=1 reference refers to the right end of the span (i.e. Xb). As described above, the interpolation weight value W refers to the relative weight for a direct interpolation function which is used to determine the value of a pixel.

Creating a Pixel Interpolation token requires the generation of two numbers: the target pixel address X and the interpolation weight W. The target pixel address X generation is accomplished by counting from the leftmost X value generated from the vertical interpolation step. For generating W, the method of interpolation must first be determined. In the preferred embodiment, a linear interpolation method is used. It would be apparent to one skilled in the art to use other interpolation methods, e.g. perspective corrected interpolation. It should be noted that use of alternative interpolation methods would have an effect on W as well as an effect on the direct solution method of linear interpolation utilized in each of the succeeding processing units. It is anticipated that a perspective corrected implementation may be used to calculate W, while the linear interpolation methods retained within each of the processing units, thus enabling a perspective corrected implementation without requiring the replacement of all the processing units of a rendering pipeline.

In the preferred embodiment a function W(X) is calculated for each span. The function W(X) is defined as:

$$W(X)=(X-Xleft)/(Xright-Xleft).$$

Since a linear interpolation of the pixels across the span is being performed, the slope m of the W(X) function is constant and can be computed once for the span via the equation:

$$m=1/(Xright-Xleft).$$

Thus, by substitution the W(X) function can be reduced to the equation:

$$W(X)=m(X-Xleft).$$

This function is desirable since it minimizes the division operations that would need to be performed for the span. So for each pixel in the span, the x-coordinates of the pixel being rendered and the left most endpoint of the span are inserted into the W(X) function in order to derive the interpolation weight W for that pixel.

Figure 10:
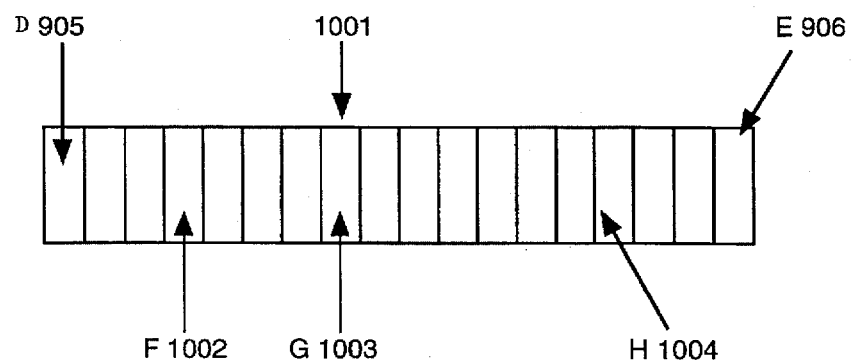
FIG. 10 illustrates an example of Horizontal Interpolation in the preferred embodiment of the present invention.

FIG. 10 illustrates several pixel locations in a span 1001. The span 1001 was derived using the vertical interpolation of the preferred embodiment with respect to FIG. 9. In any event, counting sequentially as described above, a pixel F 1002 has coordinates (56, 100). The corresponding pixel interpolation weight is calculated as $W_F=56-53/70-53=3/17$. A pixel G 1003 has coordinates (61, 100) and a corresponding pixel interpolation weight that is calculated as $W_G=61-53/70-53=8/17$. Finally, a pixel H 1004 has coordinates (67, 100) and a corresponding pixel interpolation weight that is calculated as $W_H=67-53/70-53=14/17$.

Horizontal Interpolation

Horizontal interpolation generally refers to the shading of the consecutive pixels within a span. As described above, the first stage of the pipeline performs set-up for the horizontal interpolation process by calculating pixel weighting values, assembling pixel interpolation tokens and generating span set-up tokens. In the preferred embodiment the shading functions are distributed. Each stage or processing unit performs a separate and distinct function in the rendering of a pixel. In the rendering process, horizontal interpolation requires the greatest amount of processing resource.

Advanced shading models require a great deal of data to render a pixel. For example, a Z buffered Phong shading calculation requires Z, diffuse color (RGBαd), specular color (RGBs), specular power (Ns), and surface normal vector (NxNyNz) as inputs. Depending on accuracy, this represents about 150 bits of data which must be generated per pixel. To perform the shading of the preferred embodiment, approximately 224 bits would be required. The width of this data contributes to the high cost of known high quality rendering hardware.

To reduce the width of the data path, while still maintaining 1 pixel per clock rendering speeds, the rendering pipeline of the preferred embodiment utilizes distributed parameter interpolation for determining the value of pixels in a span. As described above, each processing unit in the pipeline performs a certain part of the rendering functionality. Each processing unit requires specific parameter data (e.g. the Z buffer processing unit requires the interpolated Z value for each pixel) in order to calculate it's predetermined function. So, set-up tokens generated in stage 1 with the parameter information are first sent down the pipeline. Storage mediums, e.g. registers are embodied within each processing unit for storing the left and right parameter values of the current span (e.g. the Z buffer processing unit has $Z_0$ and $Z_1$ registers). Rather than passing actual interpolated parameter values down the pipe, the pixel rendering process is driven by the Pixel Interpolation token. As described above, this token includes W, representing an interpolation weight between 0 and 1. As each processing unit receives the Pixel Interpolation token, it performs a linear interpolation of the left and right span values to calculate the interpolated parameter value for the pixel. So at a pixel location N, in a span with left endpoint A and right endpoint B, a shading parameter value $P_N$ may be calculated by using the linear interpolation function $$P_N=P_A(1-W)+P_B(W).$$

Because a typical span is several pixels wide, distributed parameter interpolation reduces the amount of data that must flow down through the pipeline. For, example, to do the Z buffer calculation for a 7 pixel wide span, first a Span Setup token is sent, initializing the $Z_0$ and $Z_1$ registers (32 bits each). This requires the same bandwidth as sending two actual interpolated Z values down the pipeline. However, after this stage, each pixel in the span only requires a W value to drive direct interpolation means embodied in each of the processing units. In a comparison of a relative bandwidth, sending 7 interpolated Z-Values down the pipeline requires 224 bits, while rendering 7 pixels by sending interpolated values requires 7*32+7*10=134 bits. This results in a 50% reduction in data bandwidth requirements. In fact, because many parameters are distributed, and all are interpolated by the same 10 bit W value, the overall saving may be much higher.

Effectively this technique increases silicon complexity to reduce dependence on fast interconnections between processing units. Each processing unit requires multipliers for the interpolation function, whereas typical rendering hardware only needs an accumulator to implement a forward differencing algorithm. Although similar techniques could be used to distribute the forward differencing algorithm (although savings are lower, because more setup accuracy is required), there are other factors which favor distributing the parameter interpolation function. Distributed Parameter Interpolation allows the use of perspective corrected interpolation-forward differencing is limited to linear interpolation. Perspective corrected interpolation provides superior texture mapping quality by avoiding the distortions inherent in linear interpolation.

Referring back to FIG. 10 an example of horizontal interpolation based on the vertically interpolated span from FIG. 9, is provided. As above, the span endpoint coordinates are D (53,100) 905 and E (70,100) 906. Span set-up parameter values have been propagated down the pipeline token corresponding to the shading parameter values for the endpoints of the span. A pixel interpolation token provides the pixel coordinates and weight value. What is left is to calculate the shadings values for pixels across the span. Using the W values calculated above in the description of generating a pixel interpolation token, at point F (56, 100) 1002 the shading parameter values may be calculated as $P_F=P_A(1-W_F)+P_B(W_F)=P_A(14/17)+P_B(3/17)$. At point G (61, 100) 1003 the shading parameter values may be calculated as $P_G=P_A(1-W_G)+P_B(W_G)=P_A(9/17)+P_B(8/17)$. At point H (67, 100) 1004 the shading parameter values may be calculated as $P_H=P_A(1-W_H)+P_B(W_H)=P_A(3/17)+P_B(14/17)$.

Shadowing

As described above, the preferred embodiment may perform shadow analysis to further eliminate pixels from processing. The shadowing algorithm utilized in the preferred embodiment provides for the determination of object shadow volumes (with respect to a particular light source). All objects inside of the volume would thus be in shadow. Sets of dummy polygons, bounding the shadow volume, are calculated by the host processor (or alternatively by control processors as illustrated in FIG. 6a). The face normals of the polygons are oriented so that they face outward from the volume. Using these dummy polygons, the processing unit then determines whether each pixel on a visible object is inside one of the shadow volumes.

The determination of whether an object is in shadow occurs in three passes of the objects. In a first pass, a z-buffer calculation is performed to identify the front most object at every pixel. The first pass is the default operation of the Z-buffer and occurs with or without shadow processing. In a second optional pass, the determination of which of the identified visible pixels are inside a shadow volume is done by examining the shadow volumes in front of each pixel. This is specified when the shadow count flag in the global mode setup token is set. During this second pass the closest Z-values are read from the buffer and compared with incoming shadow polygons for each light source. The shadow polygons can be either front or back facing. Their orientation is specified by a flag, "front", specified in the Z setup token (described in more detail below). A shadow count is then determined in the following manner: If a shadow polygon in front of the pixel faces the front of the scene the shadow count is decremented by one. If a shadow polygon in front of the pixel faces the rear of the scene, the shadow count is incremented. A volume entirely in front of the pixel will generate one increment and one decrement at that pixel, leaving the shadow count unchanged. If, the shadow count is lower than it began after all the shadow polygons have been processed; the pixel is in shadow with respect to that polygon. In any event, the original "closest" Z value is written back into the buffer unchanged during this operation.

A third optional pass is implemented when the shadow test flag in the global mode token is set. In the third pass, the "closest" Z-values are read from the buffer and compared with the incoming Z-values. If they are equal then the shadow count is examined. If the shadow count is equal to zero then the object is not in shadow and it is output. If the shadow count is not equal to zero then the pixel interpolation token is modified to become a null token.

Tokens in the Preferred Embodiment

As described above, informational and control units that are transferred between the different stages are called tokens. Token is a term of art that refers to a data structure with accompanying information, that is passed between the stages in the pipeline. Upon receiving a token, each of the processing units may then 1) process and interpret the token, 2) pass the token to a next processing unit without processing or 3) terminate the processing of the token. All processing units only process tokens that contain information needed by the particular processing unit. Otherwise, the token flows through the processing unit unused.

Tokens in the preferred embodiment can be categorized into three different types; General Tokens, Setup Tokens and Control Tokens. Three attributes are common to all tokens. First, each of the tokens has a width of 77 bits. 77 bits was chosen as a number that would accommodate all information needed as well as providing for the inclusion of new functionality. As some tokens will not require all 77 bits, some of the bits are unused within the pipeline. Although 77 bits are utilized in the preferred embodiment, it would be apparent to one skilled in the art to utilize a different number as the token width.

A second common attribute of all the tokens is the use of the first bit in the token. The first bit of each token identifies the token as being a set-up token or a non-setup token (i.e. a general or control token), and is called the PSetup bit. This is done to facilitate and simplify the design of the individual processing units that comprise the pipeline.

The third common attribute is the use of the succeeding 4 bits after the first bit as a TokenID field. The TokenID field identifies the token and provides further information for the processing of the token.

The bit positions of data on the token is important because the underlying circuitry which interprets the tokens has hard-wired logic to specific bit positions on them. For example, as a token enters a processing unit, it initially is saved in a latching means. Hard wired logic, e.g. an OR gate, inspects a predetermined bit to determine a logic path that the token will follow. Such circuit design techniques are known in the art. However, it would be apparent to one skilled in the art to modify the position of the information and to modify the underlying hardware to reflect the new positions. Alternatively, a means for interpreting tokens without hardwiring to specific bit positions may be employed, e.g. through a token parsing means. Such modifications would not depart from the spirit and scope of the present invention.

General Tokens

General tokens are recognized by all chips in the pipeline. There are three general tokens; the null token, the pixel interpolation token and the pixel overlay token. The null token is a pixel interpolation token whose processing has been terminated. Processing may typically be terminated because Stage 2 processing has determined that the corresponding object is behind or in the shadow of another object. A null token has a false value in it's PSetup bit and a zero (0) value in the TokenID field.

Pixel interpolation tokens are used to drive the horizontal interpolation process and contain information about a pixel to be rendered. Generation of the values in the pixel interpolation token is described in detail below with respect to horizontal interpolation. The pixel interpolation token is illustrated in Chart A.

CHART A
Pixel Interpolation Token

| | Field | Width | Value/Use |
|---|---|---|---|
| 1. | PSetup | 1 | False |
| 2. | TokenID | 4 | 1 |
| 3. | X | 11 | Pixel in current scanline segment |
| 4. | W | 12 | Interpolation constant |
| 5. | A | 10 | Diffuse/Shaded color |
| 6. | R | 10 | Diffuse/Shaded color |
| 7. | G | 10 | Diffuse/Shaded color |
| 8. | B | 10 | Diffuse/Shaded color |
| 9. | ForceAdditive | 1 | 1=Force this interpolation to act in additive mode |
| 10. | Unused | 8 | Reserved; must be zero |

Line 1 indicates that bit 1 will have a false value (typically 0) to indicate that it is not a set-up token. Line 2 identifies the pixel interpolation token as having a TokenID of 1. From Line 3, it is shown that the next 11 bits will contain the X coordinate for the pixel. This may have come from either the vertical interpolation processing, which would indicate that the pixel is on one of the active edges, or from a counting means that is used to identify the X coordinates across the span.

From line 4, the next 12 bits will contain the interpolation weight. This interpolation weight will have been generated in stage 1 during the horizontal interpolation process. Lines 5–8, i.e. the next 40 bits contain the RGBα information describing the diffuse/shaded color for the pixel. Next, a force additive field is used to indicate that additive transparency blending will be performed in the compositing stage. Finally, the remaining 8 bits of the pixel interpolation token are unused.

W is used to interpolate between the boundary values, generating Z, R, G, B, and α. For R, G, and B the interpolation operation results in Gouraud shading. X is used as an address by the Z buffer to access a Z value. The Z values in the buffer are the "closest" current Zs to be processed. In operation, the "closest" Z is read from the buffer and compared with the interpolated Z. If the interpolated Z is closer (less that or equal to it), it is stored in the buffer, the token not modified, and R, G, B and α are output. If the interpolated Z is not closer (greater than it), then it is not written into the buffer, the token is modified to be a null token and R, G, B and α are not output.

The pixel overlay token is generated by the control processor and provides a means by which pixels can be directly assigned. This may occur for, for example, when titling is desired on a particular image. The format of the pixel overlay token is illustrated in Chart B.

CHART B
Pixel Overlay Token

| | Field | Width | Value/Use |
|---|---|---|---|
| 1. | PSetup | 1 | False |
| 2. | TokenID | 4 | 2 |
| 3. | X | 11 | Pixel in current scanline segment |
| 4. | W | 12 | Interpolation constant |
| 5. | R | 10 | Diffuse/Shaded color |
| 6. | G | 10 | Diffuse/Shaded color |
| 7. | B | 10 | Diffuse/Shaded color |
| 8. | A | 10 | Diffuse/Shaded color |
| 9. | ForceAdditive | 1 | 1=Force this overlay to act in additive mode |
| 10. | Unused | 7 | Reserved; must be zero |

Set-Up Tokens

As noted above, set-up tokens are generated during stage 1 pre-processing. Generation of set-up tokens is described in more detail in the description of vertical interpolation. The set-up tokens contain span parameter information for corresponding pixel rendering functions.

Set-up tokens provide the span endpoint parameter values that are utilized during the horizontal interpolation process. The different types of set-up tokens include Z set-up, Diffuse RGB set-up, Specular RGB set-up, Map set-up and Normal set-up.

CHART C illustrates a Z setup token. Like all tokens, the first 5 bits are comprised of a PSetup bit and a TokenID. In this instance, since it is a setup token, the value of this PSetup bit is a true value (e.g. a binary 1 value). The Z setup token contains two horizontal Z boundary values, Z0 and Z1 (on lines 3 and 7 respectively), which are used for interpolating between to generate a Z value for each pixel of a span. The Z Setup token also contains a bit called front (on line 5). This bit is used during the shadow calculation to determine whether or not the pixel is obscured due to a shadow. Finally, a bit called diffuse is provided (line 4). The diffuse bit is used to enable lighting calculations that would be performed when determining if the pixel is in shadow.

The Z set-up token is utilized in stage 2 of the pipeline for performing hidden surface removal and shadow calculations.

CHART C
Z Set-up Token

| | Field | Width | Value/Use |
|---|---|---|---|
| 1. | PSetup | 1 | True |
| 2. | TokenID | 4 | 1 |
| 3. | $Z_0$ | 32 | $Z_0$ |
| 4. | Diffuse | 1 | Lighting calculations enabled |
| 5. | Front | 1 | Front facing shadow plane |
| 6. | Unused | 2 | Reserved; must be zero |
| 7. | $Z_1$ | 32 | $Z_1$ |
| 8. | Unused | 4 | Reserved; must be zero |

The Diffuse RGB set-up token is used to provide RGB values based on a diffuse reflection model. The Diffuse RGB set-up token is illustrated in Chart D. The Lines 3–6 provides the diffuse color components for the left most pixel in the span. The lines 7–11 provide the diffuse color components for the right most pixel in the span.

CHART D
Diffuse RGB Set-up Token

| | Field | Width | Value/Use |
|---|---|---|---|
| 1. | PSetup | 1 | True |
| 2. | TokenID | 4 | 0Xα |
| 3. | $Ad_0$ | 9 | Diffuse $colour_0$ |
| 4. | $Rd_0$ | 9 | Diffuse $colour_0 * Kd_0$ |
| 5. | $Gd_0$ | 9 | Diffuse $colour_0 * Kd_0$ |
| 6. | $Bd_0$ | 9 | Diffuse $colour_0 * Kd_0$ |
| 7. | $Ad_1$ | 9 | Diffuse $colour_1 * Kd_1$ |
| 8. | $Rd_1$ | 9 | Diffuse $colour_1 * Kd_1$ |
| 9. | $Gd_1$ | 9 | Diffuse $colour_1 * Kd_1$ |
| 10. | $Bd_1$ | 9 | Diffuse $colour_1$ |

The Specular RGB set-up token is used to provide RGB values based on a specular reflection model. The Diffuse RGB set-up token is illustrated in Chart E. The Lines 3–5 provides the specular color components for the left most coordinate in the span. Line 6 provides the specular power component for the left most coordinate in the span. The lines 7–10 provide the specular color components for the right most coordinates in the span. Line 11 provides the specular power component for the right most coordinate in the span.

CHART E
Specular RGB Set-up Token

| | Field | Width | Value/Use |
|---|---|---|---|
| 1. | PSetup | 1 | True |
| 2. | TokenID | 4 | 3 |
| 3. | $NS_0$ | 9 | Specular $power_0$ |
| 4. | $Rs_0$ | 9 | Specular $colour * Ks_0$ |
| 5. | $Gs_0$ | 9 | Specular $colour_0 * Ks_0$ |
| 6. | $Bs_0$ | 9 | Specular $colour_0 * Ks_0$ |
| 7. | $Ns_1$ | 9 | Specular $power_1$ |
| 8. | $Rs_1$ | 9 | Specular $colour_1 * Ks_1$ |
| 9. | $Gs_1$ | 9 | Specular $colour_1 * Ks_1$ |
| 10. | $Bs_1$ | 9 | Specular $colour_1 * Ks_1$ |

The Normal set-up token is used to define normal values for each of the the coordinate endpoints. The Normal set-up token is illustrated in Chart F. The lines 3–5 define the normal for the left most pixel in the span and the lines 6–8 define the normal for the right most pixel in the span.

CHART F
Normal Set-up Token

| | Field | Width | Value/Use |
|---|---|---|---|
| 1. | PSetup | 1 | True |
| 2. | TokenID | 4 | 4 |
| 3. | $Nx_0$ | 12 | $Normal_0$ |
| 4. | $Ny_0$ | 12 | $Normal_0$ |
| 5. | $Nz_0$ | 12 | $Normal_0$ |
| 6. | $Nx_1$ | 12 | $Normal_1$ |
| 7. | $Ny_1$ | 12 | $Normal_1$ |
| 8. | $Nz_1$ | 12 | $Normal_1$ |

Control Tokens

Unlike general tokens and set-up tokens, control tokens are generated by the control processor (with one exception being a Scanout Data token, which is also generated by the Z chip 705 when scanning out its buffer). Control tokens are commands to target chips in the pipeline to perform a particular function, e.g. swap buffers, output scanline, etc. It is through the use of control tokens that operation and resources of the pipeline are managed.

The Load Scanline DMA Write Register Control Token, illustrated in Chart G, is used to control the writing of a dear register in the Stage 2 and 3 processing units.

CHART G
Load Scanline DMA Write Register Control token

| | Field | Width | Value/Use |
|---|---|---|---|
| 1. | PSetup | 1 | False |
| 2. | TokenID | 4 | 0xF |
| 3. | OpCode | 8 | 1 |
| 4. | RGB | 1 | Target RGB chip |
| 5. | Z | 1 | Target Z chip |
| 6. | Unused | 22 | Reserved, must be zero |
| 7. | WriteValue | 40 | Value written by scanline DMA |

The Scanline DMA setup/start Control Token provides the start address, length, delay, write, scanout enable, and scanout mode data, and is illustrated in Chart H. The DMA reference is to a Direct Memory Access component in the computer system. In order to avoid going through the host processor to send data to the system display buffer, a DMA a component is typically utilized. The RGB/Z flag at lines 4–5 is used to indicate which of the stage 1 or stage 2 processing units the the token is targeted for. The delay field on line 8 specifies how may pixels to let flow through before beginning to read from the scanout buffer. The flag is necessary since the buffer may be cleared without outputting its contents. The scanout mode field on line 11 specifies which 32 of the 40 bits in each pixel location should be read out. The different modes are: read 40 bits and round to 32 bits. The round to 32 bit mode is not used in the stage 2 processing unit. The scanout enable is used to permit scanout of the contents of the buffer. Finally, the token is used to initiate the writing of the buffer.

CHART H
Scanline DMA setup/start Control Token

| | Field | Width | Value/Use |
|---|---|---|---|
| 1. | PSetup | 1 | False |
| 2. | TokenID | 4 | 0xF |
| 3. | OpCode | 8 | 2 |
| 4. | RGB | 1 | Target RGB chip |
| 5. | Z | 1 | Target Z chip |
| 6. | Start | 11 | Starting address |
| 7. | Length | 11 | Number of pixels to access |
| 8. | Unused | 14 | Reserved, must be zero |
| 9. | ScanoutEnable | 1 | Read and scanout addressed locations |
| 10. | Unused | 1 | Reserved, must be zero |
| 11. | ScanoutMode | 1 | 1=round mode, 0=no round |
| 12. | WriteEnable | 1 | Write addressed locations from reg |
| 13. | Unused | 22 | Reserved, must be zero |

The Wait for Scanline DMA Completion Token is used to determine if the back buffer is done scanning out or clearing the data, and is illustrated in Chart I. As the stage 2 and stage 3 processing units are double buffered, one buffer may be scanned out while the other is being written to. If the back buffer scanout is not completed, the stallout signal is asserted. This prevents the swapping of buffers. Once the scanout is completed, the stallout signal is negated. This assures that the buffers will not be swapped until the scanout is completed.

CHART I
Wait for Scanline DMA Completion Control Token

| | Field | Width | Value/Use |
|---|---|---|---|
| 1. | PSetup | 1 | False |
| 2. | TokenID | 4 | 0xF |
| 3. | OpCode | 8 | 3 |
| 4. | RGB | 1 | Target RGB chip |
| 5. | Z | 1 | Target Z chip |
| 6. | Unused | 62 | Reserved, must be zero |

When a complete Z-Buffer or compositing operation is completed for an entire scanline, the two buffers may be swapped. The Swap Buffers Control Token illustrated in Chart J. Once the buffers have been swapped, the back buffer can be cleared or scanned out using the DMA setup/start token described above.

CHART J
Swap Buffers Control Token

| | Field | Width | Value/Use |
|---|---|---|---|
| 1. | PSetup | 1 | False |
| 2. | TokenID | 4 | 0xF |
| 3. | OpCode | 8 | 4 |
| 4. | RGB | 1 | Target RGB chip |
| 5. | Z | 1 | Target Z chip |
| 6. | Unused | 62 | Reserved, must be zero |

The Global mode setup token is used to initialize the pipeline to the type of rendering that will be performed, e.g. using a specular or diffuse rendering model, enable shadowing and the transparency mode. Each of the rendering type operations are discussed in detail above. The Global mode setup control token is illustrated in Chart K.

CHART K
Global Mode Setup Control Token

| | Field | Width | Value/Use |
|---|---|---|---|
| 1. | PSetup | 1 | False |
| 2. | TokenID | 4 | 0xF |
| 3. | OpCode | 8 | 5 |
| 4. | DiffuseShade | 1 | Enable diffuse shading contribution |
| 5. | SpecularShade | 1 | Enable specular shading contribution |
| 6. | ShadowCount | 1 | Enable shadow count |
| 7. | ShadowTest | 1 | Enable shadow test |
| 8. | TransMode | 1 | 1=additive, 0=blended |
| 9. | ControlFlags | 2 | Indicate control/data, and pipeline interlock |
| 10. | InvertShadow | 1 | 1=in shadow is visible 0=out of shadwo is visible |
| 11. | ForceZVisible | 1 | 1=force Z test to return "visible" |
| 12. | DisableZWrite | 1 | 1=don't allow Z/shadow bits to be written |
| 13. | Unused | 54 | Reserved, must be zero |

The Jam control token is used to used to permit the token to pass through the processing unit without any processing. It is typically used to send control information out the bottom of the pipeline. The Jam Data Control Token is illustrated in Chart L.

CHART L
Jam Data Control Token

| | Field | Width | Value/Use |
|---|---|---|---|
| 1. | PSetup | 1 | False |
| 2. | TokenID | 4 | 0xF |
| 3. | OpCode | 8 | 6 |
| 4. | Unused | 24 | Garbage |
| 5. | Data | 40 | Data to scanout |

DESCRIPTION OF PROCESSING STAGE CIRCUITRY

In the preferred embodiment, each of the successive stages in the pipeline are implemented as individual integrated circuits. Each of these chips embodies several modules which carry out the functionality of the stage. It is of note that in the preferred embodiment, the stages 2 and 3 are implemented via the same integrated circuit. The choice of operation as a Stage 2 or 3 is determined by certain control inputs that are provided to the chip. However, it would be apparent to one skilled in the art to combine multiple discrete processing units in order to eliminate transfer time that may occur because of any "off-chip" data transfers that may be required. It would also be apparent to one skilled in the art to configure the system of the preferred embodiment utilizing more discrete processing units, e.g. creating two stage one processing units performing vertical and horizontal interpolation set-up tasks. Such different hardware implementations would not cause a departure of spirit and scope from the present invention.

Clock Domains of the Rendering Architecture

To simplify system integration, the pipeline has three asynchronous clock domains. The Data Clock is used by the input port of the stage one processing unit. The Data Clock is typically synchronous to the data source and defines the maximum speed at which data can be transferred to the rendering pipeline.

The Pipe Clock drives the processing units within the pipeline (with the exception of the input port of the stage one processing unit) and effectively defines the shading speed of the pipeline. It is significant that the Pipe Clock is asynchronous to the rest of the rendering system, so that the Pipe Clock may be increased to match future generations of chip technology, without effecting the rest of the system.

The Scanout Clock is used by the Scanout of the the last stage of the rendering pipeline and is synchronous to a receiving device, e.g. the system frame buffer. The Scanout Clock controls the maximum rate at which pixels are scanned out of the on-chip scanline buffer.

Stage 1 Functional Schematic

Figure 11:
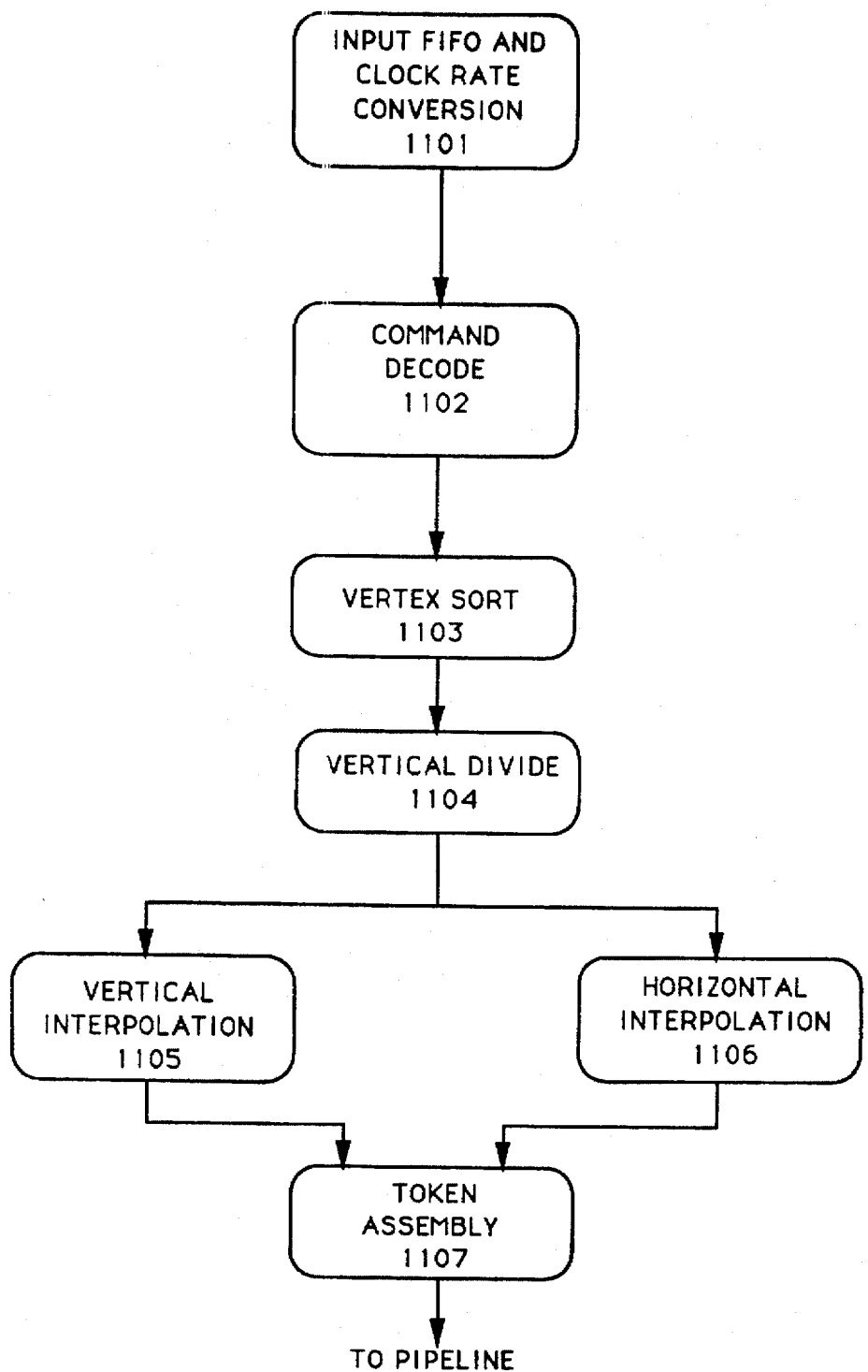
FIG. 11 illustrates the functional blocks of the Stage 1 processing unit as may be utilized by the preferred embodiment of the present invention.

FIG. 11 illustrates the functional blocks of the Stage 1 chip. An input block, 1101, provides an input FIFO and clock rate conversion. As data, e.g. object primitives from the active object list, are input into the rendering pipeline where they are first placed into an input FIFO. It should be noted that at this time that the rendering pipeline has three asynchronous clock domains. The data clock is used by the input port of the first stage and is usually synchronous to the data source, i.e. the control processors. The data clock defines the maximum speed at which data can be transferred to the pipeline. The pipe clock drives the rendering process and effectively defines the shading speed of the pipeline. Only the internal pipeline chips use this clock, so it can be increased to match chip technology without effecting the rest of the system. Pipeline data bandwidth scales with the pipe clock. Also, most computation in the Stage 1 chip is driven by the pipe clock. The scan-out clock is synchronous to the receiving device, e.g. the target frame buffer. It controls the maximum rate at which pixels are scanned out of the on chip scanline buffer. Thus, as a further function of the input block 1101, clock rate conversion from the data clock to pipeline clock is performed.

When the data exits the FIFO it enters a command decode module 1102. The command decode module 1102 decodes the data into the appropriate command structure. Most of the commands are decoded by a programmable logic array (PLA). The exceptions are the draw command and the overlay pixels command. As described above, the draw command is the fundamental command for drawing an object.

The remainder of the modules respond accordingly to a DRAW command. Briefly, two functional modules are then entered to initiate vertical and horizontal interpolations. These are vertex sort 1103 and vertical divide 1104. The vertex sort 1103 is used to determine the active edges of an object that is to be drawn. The vertical divide 1104 is used to determine the interpolation weight value that will be used for vertical interpolation. The vertical interpolation and horizontal interpolation functional modules then follow and are described above. Finally, the outputs of vertical interpolation module 1105 and horizontal interpolation module 1106 feed into a token assembly module 1107 for creation of a token. Once the token is created it is sent down the pipeline synchronized to the pipeline clock.

Input Block

The STAGE 1 chip is designed with a 64 bit input path, which can be configured as one or two 32 bit ports, or a single 64 bit port. The STAGE 1 chip is capable of processing four independent input streams, SRCID pins are used to indicate the source of each transfer. What this means is that up to four control processors may send data to the rendering pipeline(s).

Two synchronous FIFOs receive the data from the two 32 bit ports, permitting burst transfer rates of 64 bits/clock. However, once past the FIFOs, the two data streams merge into one 32 bit path, for a maximum sustained bandwidth of one 32 bit word/clock; this is roughly balanced to the sustained throughput of the remainder of the chip. Two extra bits are added to each word to indicate the source ID. Finally, the merged data stream is synchronized to the Pipe clock domain by a one word/clock synchronizer.

The preferred embodiment utilizes 16 word deep FIFOs, providing 64 bytes of buffering for each input port in Dual 32 and Single 64 input modes. However, in Single 32 mode, Port A ping-pong between the two FIFOs, effectively doubling depth. The FIFOs are compiled, so the depth may be increased in alternative embodiments.

A further function provided in Stage 1 is flow control. Flow control is used to prevent overrun of input buffers of the stage 1 FIFO. Flow control is achieved with a STALL signal for signalling to the control processor to stop sending data. Additionally, an EMPTY signal is provided and can be used to drive DMA bursts (i.e. for signalling to the control processors to commence sending data). When the EMPTY signal is provided, the pipeline(s) will accept a predetermined number of data transfers prior to asserting the STALL signal.

Because it is the first chip in the pipe, the STAGE 1 chip must perform vertical interpolation on all the data types necessary for different rendering functions. Because it is difficult to predict what data types will be necessary in the future, the STAGE 1 chip is designed to process a generic data type called a parameter, which represents data in any of a variety of supported data types.

Each parameter has two data types associated with it: the input format, which represents the format in which the data is input into STAGE 1, and the processing format, which is the internal format in which the STAGE 1 chip stores, interpolates and sends the data down the pipe. Input formats are chosen to be well aligned and easy to manipulate for the control processors. Processing formats represent the actual minimum precision necessary for the data. For example, the input format of a normal vector might be three 16 bit signed integers, while the processing format is three 12 bit signed integers. The STAGE 1 chip supports five input formats and four processing formats as illustrated in the following Charts M and N.

CHART M
Data Input Formats

| Input Format | Type | Num Fields | Input Data Size | Typical Use |
| --- | --- | --- | --- | --- |
| 4 × 8U | Unsigned 8 bit int | 4 | 32 bits | RGBA |
| 3 × 10S | Signed 11 · 11 · 10 bit int | 3 | 32 bits | Vector |
| 3 × 16S | Signed 16 bit int | 3 | 64 bits | Vector |
| 2 × 16U | Unsigned 16 bit int | 2 | 32 bits | X,Y |
| 1 × 32U | Unsigned 32 bit int | 1 | 32 bits | Z |

CHART N
Processing Formats

| Processing Format | Type | Num Fields | Storage Size | Typical Use |
| --- | --- | --- | --- | --- |
| 4 × 9U | Unsigned 9 bit int | 4 | 36 bits | RGBA |
| 3 × 12S | Signed 12 bit int | 3 | 36 bits | Vector |
| 2 × 16U | Unsigned 16 bit int | 2 | 36 bits | X,Y |
| 1 × 32U | Unsigned 32 bit int | 1 | 36 bits | Z |

Only the 3×12S format used for vectors is signed. It would be apparent to provide a more flexible design that would permit any parameter to be specified as signed or unsigned.

The format information for the different vertex types is stored in an Input Data Format RAM; this RAM is loaded by the host processor, so new parameters can be added as required. Each DRAW command sent to the stage 1 processing unit includes FormatAddress, the address of the appropriate vertex format description. The first word holds the number of words of data for each vertex; it's read and loaded into a 5 bit counter, which counts the words as they are formatted and output. The format information is re-read for each subsequent vertex until the Draw command is complete.

In the preferred embodiment, only two parameter data types are fixed: the X and Y projected screen coordinates of each vertex are 16 bit unsigned ints, in a 13.3 format. This format addresses a 213=8192×8192 pixel screen space with ⅛ of a pixel resolution and pixel centers at 0.50.

Command Decode

When received in STAGE 1, the DRAW command is handled by circuit logic in the STAGE 1 processing unit. Most other commands are single 32 bit words, which are decoded by a PLA. The exception is the Overlay Pixels command, which requires two 12 bit counters, one to compute pixel address, the other to count pixels.

The Command Decode Module generates one token per clock; a token either writes a control register, writes a location in the vertex parameter RAM, or renders a span of a triangle.

Vertex Sort

As described above, the Draw command draws a triangle between vertices $V_A$, $V_B$ and $V_C$, each of which specifies one of the four vertices stored in the parameter RAM. The Vertex Sort module then fetches the Y coordinate of each of the three vertices, and determines which two edges of the triangle are active (i.e. intersect with the horizontal line specified by the contents of the YCurrent register which defines the current scanline). If two active edges are found, the triangle is visible, and the top and bottom Y of both edges are passed to a Vertical Divide module. Although the vertices are sorted vertically, the horizontal span start and end points have not yet been calculated, so the edges are arbitrarily designated A and B. Later, when the X co-ordinates have been interpolated, the final left/right test is performed, and the edges are swapped if necessary.

As described above, an edge is considered visible/active if it satisfies this equation:

$$Y_{Top} < Y_{CurrentScanline} <= Y_{Bottom}$$

where the Y co-ordinate increases from top to bottom. Note that the test is not $Y_{Top} <= YCurrentScanline <= Y_{Bottom}$, which would occasionally cause boundary pixels between abutted polygons to be rendered twice (a serious problem when rendering transparent objects).

Vertical Divide

The Vertical Divide module has two active dividers, which calculate the interpolation weight of the two edges A and B:

$$W_A = (Y_{BottomA} - Y_{CurrentScanline})/(Y_{BottomA} - Y_{TopA})$$

$$W_B = (Y_{BottomB} - Y_{CurrentScanline})/(Y_{BottomB} - Y_{TopB})$$

These calculations are performed to 12 bits of accuracy, requiring six clocks of latency (radix2 subtract-and-shift divide, two stages per clock). The interpolation weights are passed directly to the Vertical Interpolation to determine span coordinates and parameter values.

In the preferred embodiment all vertex parameters are stored in four 64×36 RAM. The address for a given parameter is a concatenation of the parameter number and the stream context (vertex number selects between RAMs). By using four RAMs, a parameter can be simultaneously read for all four vertices; combined with a 4×4 36 bit crosspoint switch, the tip and bottom parameter values for both active edges can be simultaneously read and transferred to linear interpolators (LIRPs) for generation of the parameter values.

STAGE 2 and 3 Functional Description

In the preferred embodiment, the processing units for stages 2 and 3 are identical. This is a desirable since it provides for economic efficiencies in the manufacture of the pipeline components. It is apparent that the same component may be used when the requirements of a stage one processing unit and a stage two processing unit are compared. When performing scanline Z-buffering or operating as a compositing engine, both require at least one complete scanline of memory. In the preferred embodiment two complete scanlines of memory have been provided in order to support double buffering and to allow scanouts of a previously rendered scanline while a new scanline is being rendered. Both require linear interpolation of RGB values. In stage two it is the generated ambient RGB values and in stage three it is the blended alpha values used for transparency. Finally, both require identical pipeline control signals (e.g. stall signals) and means for sending and receiving signals.

However, some differences do exist. First, Z-buffer and shadowing logic is not needed by the compositing engine. Second, the scanout of the stage 3 compositing engine is synchronous with the receiving device and as in a different clock domain from the pipeline. However, these differences are minor so that the economies of manufacture would outweigh any potential advantages of having separate components.

A Zchipin signal is used to configure the processing unit. When the Zchipin signal is high, the unit is configured as a stage 2 Z-buffer. Conversely, when the Zchipin signal is low, the unit is configured as a stage 3 compositing engine. The functions performed when configured as a Z-buffer are Z-search; shadow calculation and ambient color calculation. The functions performed when configured as a compositing engine are pixel blending and scanout.

Figure 12:
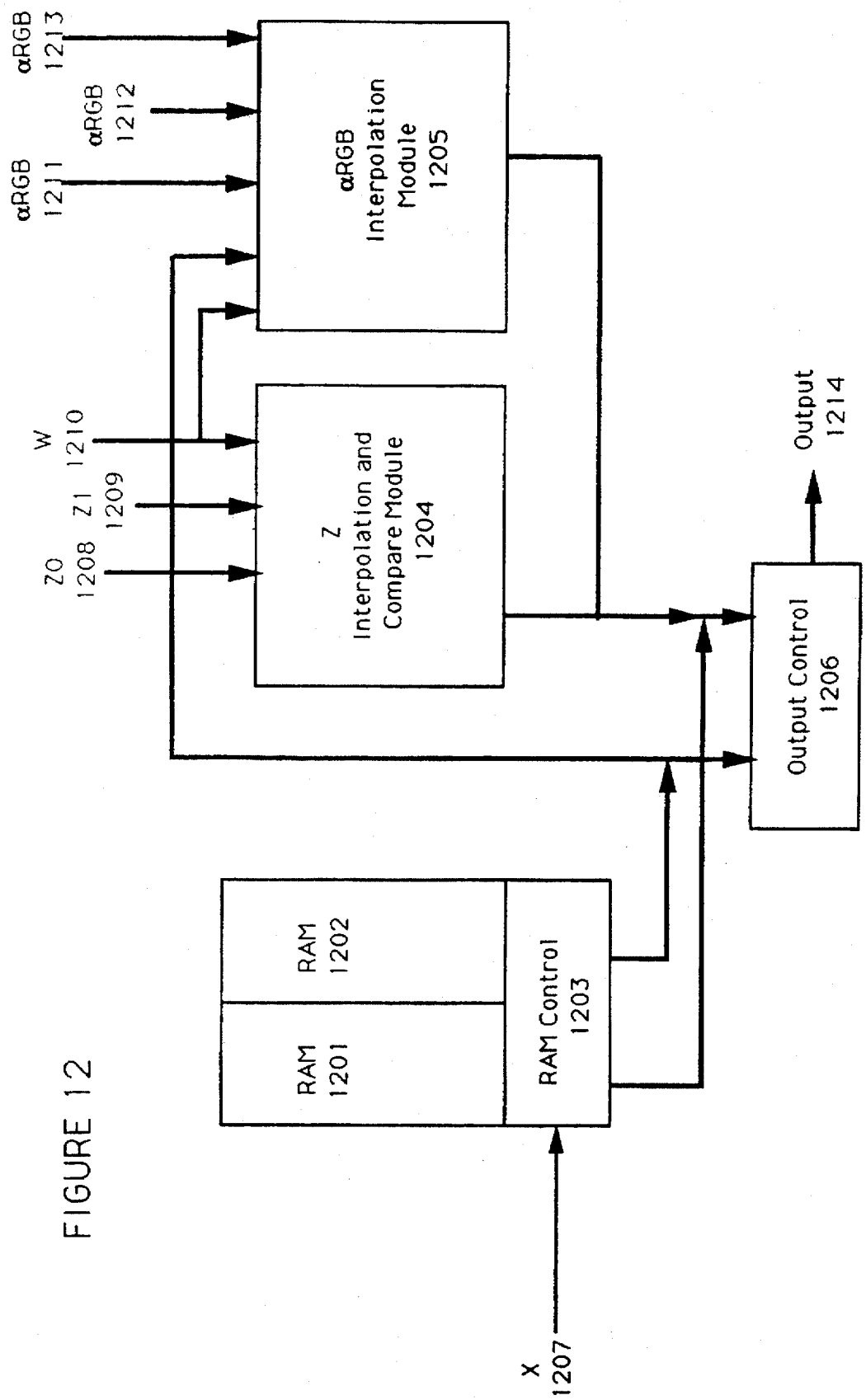
FIG. 12 is a schematic functional diagram of a Stage 2 and/or Stage 3 processing unit as may be utilized by the preferred embodiment of the present invention.

FIG. 12 is a functional block diagram of a stage 2/3 processing unit. A RAM 1201 and a RAM 1202 comprise the dual buffers and consist of one scanline of memory each. In the preferred embodiment each of RAM 1201 and 1202 comprise 648 words (each word having 40 bits) of random access memory. RAM control 1203 receives the X data (i.e. the pixel location) from the pixel interpolation token and provides corresponding Z-values to the Z interpolation and compare module 1204 and corresponding αRGB values to the αRGB interpolation module 1205.

The Z-interpolation and compare module 1204 performs the Z-buffering required to identify the front-most pixels. The Z-interpolation and compare module 1204 further receives the endpoint Z-values 1208 and 1209 from the Z set-up token and the pixel weight W 1210 from the pixel interpolation token. The Z-interpolation and compare module 1204 is coupled to the RAM control 1203 to receive the current Z-value at a pixel location and for inserting a new Z-value into the scanline Z-buffer when appropriate (i.e. the Z-value of the current pixel is less than the current value in the Z-buffer). The Z-interpolation and compare module 1204 is further coupled to output control 1206 for allowing the output of a front-most pixel via the pixel interpolation token (typically by not converting it to a null token).

The αRGB interpolation module 1205 performs the initial ambient color calculation of stage 2 and the transparency calculations of stage 3. The αRGB interpolation module 1205 receives the pixel weight W 1210 from the pixel interpolation token. The αRGB interpolation module 1205 further receives the endpoint αRGB values 1212 and 1213 from the diffuse span set-up token. With respect to stage 3, the αRGB module 1205 is coupled to RAM control 1203 in order to received pixel shading values at the current pixel location and for inserting shaded (blended) pixel values back into the scanline buffer. Both the Z-Interpolation and compare module 1204 and the αRGB interpolation module 1205 contain linear interpolation circuits that are described in more detail below.

Output control 1206 controls output 1214 from the processing unit. The output 1214 of the output control 1206 will be a pixel interpolation token in stage 2 and the scanout in stage 3. In stage 2, the output control 1206 will output the contents of the interpolation module 1205 as part of the pixel interpolation token. In stage 3, the output control 1206 will output the contents of the scanline buffer, i.e. RAM 1201 or RAM 1202.

Circuit for calculating the W(X) function

Recall that the function W(X) function is used in the Vertical Interpolation Module. As it is repetitively used, the preferred embodiment has provided an efficient means for calculating the W(X) function. As any given X is a 16 bit value, the slope m covers a wide range, i.e. 1 to $1/65535$. Representing this range to 10 significant bits requires $16+10=26$ bits. Thus, at first view the W(X) function would require a 26 bit by 16 bit multiplier. However, a technique and circuit for obtaining the 10 bit result with a 12 bit by 12 bit multiplication operation has been derived and is described below.

First, it is empirically observed that 14 leading zeros are being traded between the two multiplicands. This is further supported by the observation that (Xright−Xleft) is the maximum value of (X−X left), thereby indicating the minimum number of leading zeros in this multiplicand. This is established by comparing the two multiplicands as illustrated in Chart O.

CHART O

| Value of Xright-Xleft | Leading 0s | Value of m | Leading 0s |
|---|---|---|---|
| 2–3 | 14 | 1/2–1/3 | 0–1 |
| 4–7 | 13 | 1/4–1/7 | 1–2 |
| 8–15 | 12 | 1/8–1/15 | 2–3 |
| . | | | |
| . | | | |
| . | | | |
| 32768–65535 | 0 | 1/32768–1/65536 | 14–15 |

First, the 14 leading zeros are replaced with two variables m' and $\Delta X$ based on n leading 0s, so that:

$$n = \text{LeadingOs } (X_{right} - X_{left}), \max = 14$$
$$m' = 1/(2^n(X_{right} - X_{left})) = 2^{-n}m$$
$$\Delta X' = 2n(X - X_{left})$$
$$W(X) = m'\Delta X' = 2^{-n}m2n(X - X_{left}) = m(X - X_{left})$$

Since both m' and $\Delta X'$ do not have leading zeros, both can be truncated to the 12 most significant bits (10 significant bits plus 2 guard bits).

Figure 13:
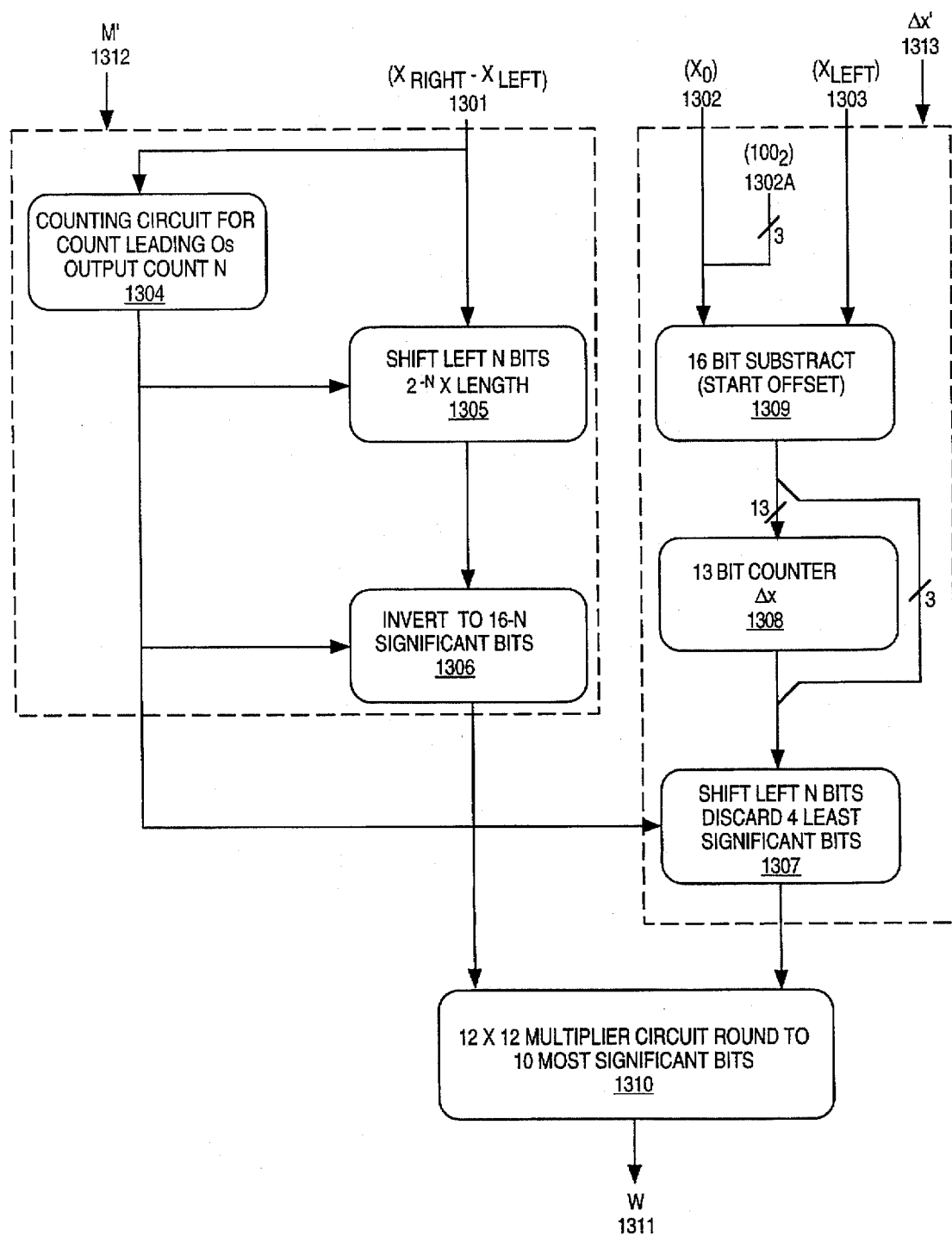
FIG. 13 is a schematic representation of a circuit for determining the pixel interpolation weight as may be utilized by the preferred embodiment of the present invention.

A schematic diagram of such a circuit is illustrated in FIG. 13. The circuit will calculate m' and $\Delta X'$ and output W. Referring to FIG. 13 circuitry within dashed box 1312 represents the calculation of m' while the circuitry within the dashed box 1313 represents the calculation of $\Delta X'$. A span length 1301, is provided as a first input to the circuit within dashed box 1312. The span length 1301 is simply the difference of $X_{right} - X_{left}$ as described above. A counting circuit 1304, determines the number of leading zeros in span length 1301 and provides an output value n. The count of leading zeros n is input to a shift circuit 1307. The shift circuit 1307 will be described in greater detail below. The span length 1301 is also provided to a shift circuit 1305. The shift circuit 1305 shifts the value of spanlength 1301 by the n bits determined in counting circuit 1304. The output of the of the shift circuit 1305 is the 12 left most bits after the shifting of the span length 1301. The output of the shift circuit 1305 is then input into an inverting circuit 1306, which inverts the input. The output of the inverting circuit is the variable m'. The output m' of the invert circuit is then provided as a first input to a multiplication circuit 1310.

An $X_0$ input 1302, i.e. the current X-coordinate of the pixel being interpolated, is combined with a binary input 1302a (which has a fixed value of 100 binary) to a create a 16 bit operand for a subtraction circuit 1309. The binary input 1302a are added as the leading bits in the created operand. The second input to the subtraction circuit 1309 is a $X_{left}$ input 1303. The $X_{left}$ 1302 input provides the X coordinate of the point that is the left most on the span being processed. Thirteen bits of the output of the subtraction circuit 1309 are provided to a 13 bit counter 1308. Three of the bits are stripped off and recombined at the output of the counter circuit 1308. The output of the counter circuit 1308 is $\Delta X$. The output of the counter 1308, along with the appended 3 bits are then provided to the shift circuit 1307 where the result is shifted by the value provided by the counter 1304, i.e. n. Further, the four least significant bits of the result are discarded, creating a 12 bit output. This output value is $\Delta X'$.

The output of circuit 1307 is then provided as a second input to the multiplier 1310. The multiplier 1310 then performs a multiplication of the outputs of inverting circuit 1306 (i.e. m') and shifting circuit 1307 (i.e. $\Delta X'$) and rounds to the ten most significant bits. The output of the multiplier 1310 is the pixel weighting value W 1311.

Linear Interpolation Function

As described throughout the description of the preferred embodiment, all interpolation is performed linearly. It would have been apparent to one skilled in the art to use other non-linear forms of interpolation in order to provide different shading functionality (e.g. perspective corrected shading). As has been discussed above, a direct evaluation technique is utilized by the preferred embodiment in order to perform required linear interpolation (as opposed to the forward differencing technique that prevails in the prior art). With reference to stage 1, linear interpolation is used to determine the end points of the horizontal spans of an object (i.e. in vertical interpolation). With respect to stage 2 and stage 3 of the pipeline, linear interpolation is performed on the values in the pixel interpolation token to estimate Z-values (stage 2) or pixel shading values (stage 3). Thus, it has been found to be advantageous to provide a linear interpolation circuit.

As described above, the equation for direct LIRP function is defined as:

$$(1-w)A+wB.$$

The LIRP function requires a weighting value w. The weighting value w is a value between 0 and 1 that specifies a linear "blend" of the values A and B. Determination of W in the creation of Pixel Interpolation Tokens was described above. W is also calculated for vertical interpolation the w is determined dynamically for each active edge of an object. For horizontal interpolation the w here corresponds to the pixel weighting value determined in stage 1. The result of this expression is A if w is zero, B if w is one, and a value between A and B when w is a positive fraction less than one.

The LIRP operation of the preferred embodiment operates in fixed precision arithmetic. Implementing the LIRP operation in fixed precision arithmetic can be wasteful. If w is defined as a binary fraction between zero and one inclusive almost an entire bit of resolution is wasted. In the case where w has 4 bits, 7 encodable values between 1.001 and 1.111 will always be unused.

In the preferred embodiment, a more efficient approach to encoding w defines 0.1111 to be one and 0.0000 to be zero. All 16 encodable values where w has 4 bits are now useful. The LIRP equation now becomes:

$$(0.1111-w)A+wB$$

If w=0.0000, the LIRP value will be 0.1111A. If w=0.1111, the LIRP value will be 0.1111B. However, in graphics applications it is known that in order to achieve high quality rendering, if w=0 or 0.0000, the LIRP value must be A and if w=1 or 0.1111, the LIRP value must be B. This is to achieve complete color saturation at the end points. A rounding factor is therefore added to the LIRP value to achieve saturation at both A and B 0.0001A is added if w<0.1000. 0.0001B is added if w>=0.1000. These rounding factors force saturation at both ends of the range of w, while tolerating some discrepancies to true linearity at some midpoints.

With the addition of this rounding factor w no longer partitions the range between A and B quite uniformly. The partition between the LIRP values when w=0.0111 and when w=0.1000 can be up to twice as large as the partition between any other two neighboring values of w. The size of this partition is, however, no larger than the size of every partition when w is encoded in the standard way described above.

In describing a circuit to perform the LIRP equation, the fixed point version of the LIRP equation above is re-written using two's complement math as follows:

$$(0.1111-w)A+wB$$

Replacing w with it's two's complement equivalent (!w is the bit inverse of w):

$$(0.1111+(!w+0.0001))A+wB$$

and rearranging terms:

$$((0.1111+0.0001)+(!w))A+wB$$

The first term drops out in two's complement form, leaving only:

$$(!w)A+wB$$

Not incidentally, this approach leads to a very regular (and thus compact and efficient) custom silicon layout. Converting to one bit multiplications by summing for i=0 to n, where n is the number of bits-1 in w (4 for this example) and $w_n$ is the most significant bit of w gives:

$$\Sigma(((!w_i)A)+(w_iB))2^{i-n}$$

This equation can be efficiently computed by using a selector for each bit $w_i$ to select between adding A or B (shifted appropriately by $2^{i-n}$).

Adding in the appropriate rounding factor to force saturation gives:

$$((!w_1A)+(w_1B))2^{-n}+\Sigma((!wiA)+(w_iB))2^{i-n}$$

Adding the rounding factors to the circuit described above is simply done by adding one new selector at the least significant bit position.

Figure 14A:
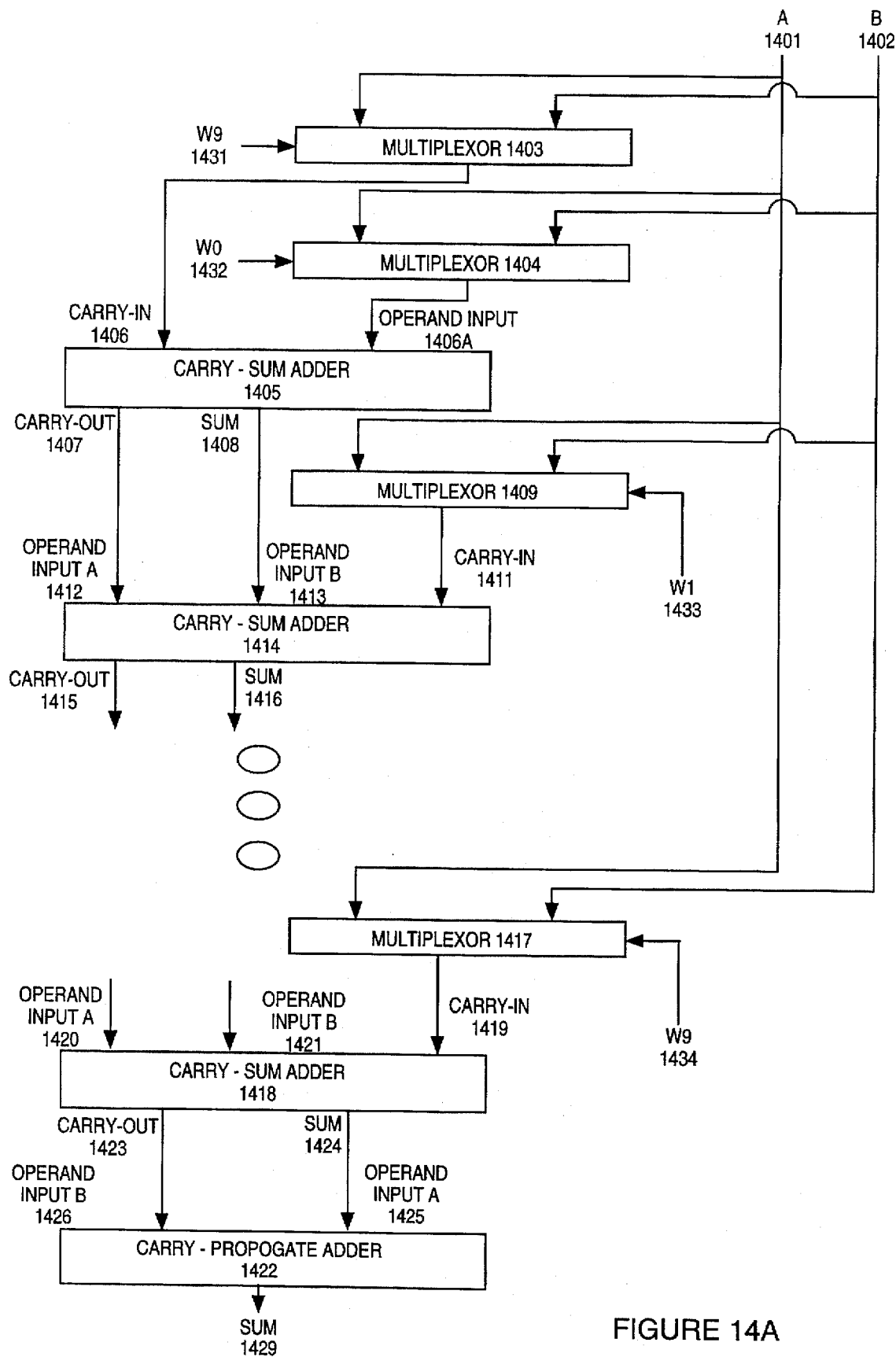
FIG. 14a is a schematic representation of a circuit for calculating a linear interpolation value as may be utilized by the preferred embodiment of the present invention.

Referring now to FIG. 14a, a circuit for linear interpolation is illustrated. The LIRP circuit is comprised essentially of 2 to 1 multiplexers, carry sum adders, and a 10 bit carry propagate adder. The LIRP circuit implements the logic described above where the bits of the Weighting Value W are used to select the output of the 2 to 1 multiplexors. The outputs of the multiplexors are added and the bit patterns are shifted appropriately to reflect the magnitude of the operands. As the circuit is somewhat repetitive, a description of a portion of the circuit will suffice.

A first input A 1401 is provided as a first input to the multiplexer 1403 and a second input B 1402 is a second input to the multiplexer 1403. The values of input A 1401 and B 1402 would typically be one of the pairs of parameter values sent through the pipeline in a set-up token. A third input, i.e. a selector value, is the value which will determine whether the first input or the second input will be output from the multiplexer 1403. The selector value to be provided to the multiplexor is a bit from the weighting value. For the multiplexor 1403, the selection value is provided by the most significant bit of the Weighting Value W, in this case W9 1431. This value is the additive saturation value needed in order to achieve full saturation at the extreme ends. In any event, it should be noted that if the selection value is a 1, the first input is output from the multiplexer, i.e. the bit pattern from A 1401. If the selection value is 0 the second input is output from the multiplexer, i.e. the bit pattern from B 1402.

Figure 14B:
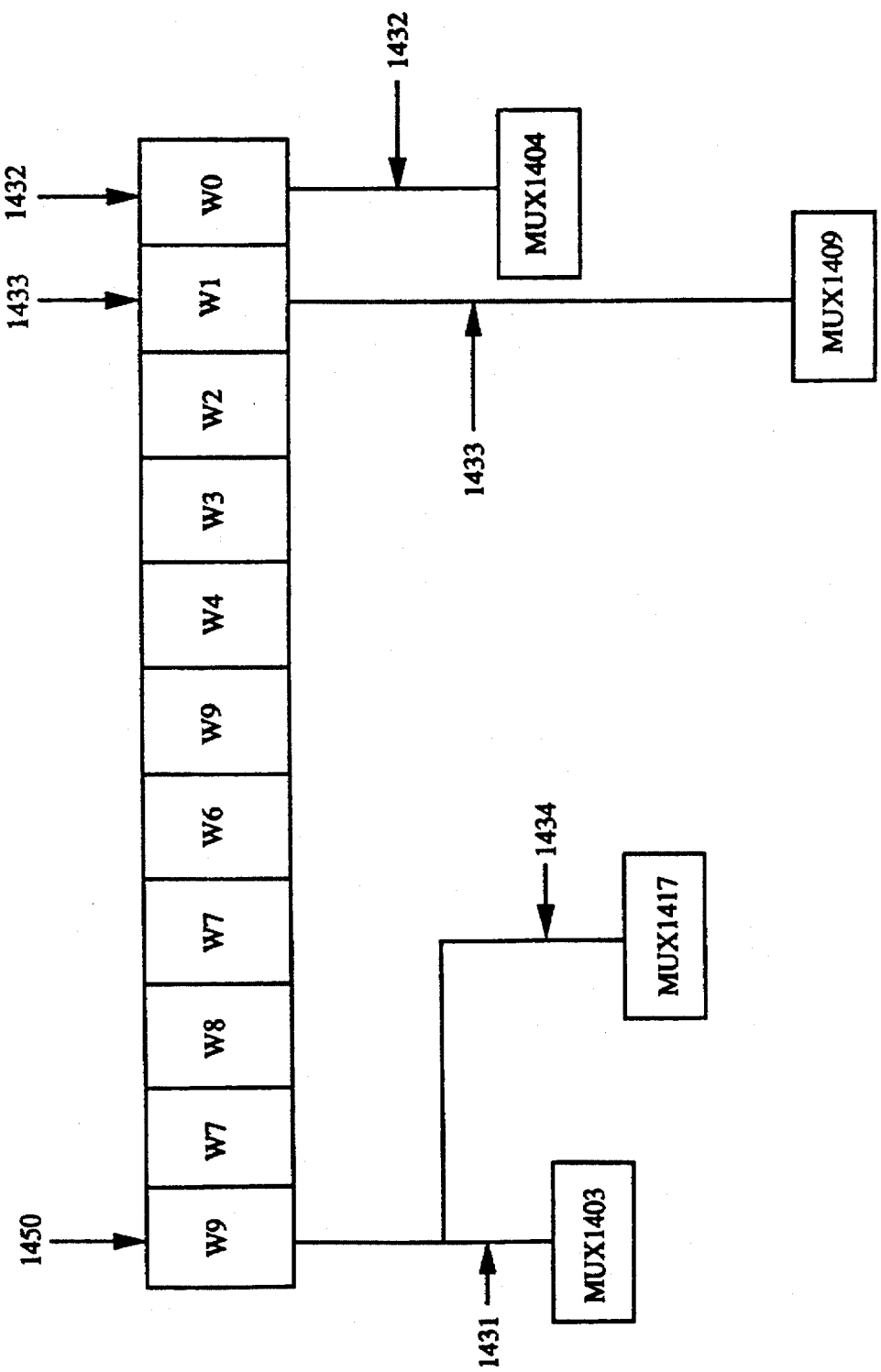
FIG. 14b illustrates the bit positions of a weighting value as may be utilized by the preferred embodiment of the present invention.

The bit layout of the weighting value W is illustrated in FIG. 14b. As is typical in computer representations, e.g., binary representations, of numeric values, the least significant digit values are in the fight most storage position. So for example, a digit W0 1432 will be the least significant digit and a digit W1 1433 is the second least significant digit. This continues from right to left storage locations unit W9 1450, which is the most significant digit. Further illustrated in FIG. 14b are the digits of W coupled to corresponding multiplexors as described with respect to FIG. 14a.

Referring back to FIG. 14a, the output of the multiplexor 1403 is coupled to a carry-in input 1406 of carry-sum adder 1405. It is also clear from FIG. 14a that the values A 1401 and B 1402 will be used as input to all the multiplexer devices.

A second multiplexer 1404 also takes as input A 1401 and B 1402. The multiplexer 1404 receives as input the least significant bit of the Weighting Value, in this case W0 1432. The output of the multiplexor 1404 is coupled to an operand input 1406a of the carry-sum adder 1405.

The carry-sum adder 1405 provides for the addition of the saturation value and of the lowest order set of bits in the multiplication (i.e. linear interpolation operation) it is performing. A carry out output 1407 and a sum output 1408 of the carry-saver adder 1405 are coupled to an operand input A 1412 and an operand input B 1413, respectively, of carry-sum adder 1414.

The multiplexor 1409 takes as selector input the the second least significant bit of the Weighting Value, in this case W1 1433. The output of the multiplexor 1409 is also an input to the carry-save adder 1414.

The additive values cascade down the combination of multiplexors and carry-sum adder devices until multiplexer 1417 is reached. In multiplexer 1417, the input is the most significant bit of the weighting value, in this case W9 1434. Again, input values A 1401 and B 1402 are inputs to the multiplexor 1417. The output of the multiplexor 1417 is coupled to a carry-in input 1419 of carry-sum adder 1418. In accordance with the description of the circuit above, operand inputs A 1420 and operand input B 1421 of carry-sum adder 1418 are coupled to the carry-out output and sum output, respectively, of a previous carry-sum adder (not illustrated). The carry-out output 1423 and sum 1424 of carry-sum adder 1418 are coupled to an operand input B 1426 and operand input A 1425, respectively, of carry-propagate adder 1422. The sum output 1429 of the carry-propagate adder 1422 will be the approximated linearly interpolated value.

It should be noted that the above circuit may be used for determining a linearly interpolated value for data of varied bit sizes. In the preferred embodiment the weighting value and inputs A and B are 10 bits in length.

Parallel Rendering Pipelines

The ability to support multiple rendering pipelines in parallel is inherent in the architecture of the preferred embodiment of the present invention. First, as parameter values are directly evaluated, there are no inter scanline dependencies. Thus, two or more scanlines can be rendered simultaneously. As described above this scanline independence also has residual effects in terms of reducing bandwidth requirements and storage requirements. Second, specific features have been provided to facilitate parallelism. Some of these features have been described above with respect to a single pipeline. Here they are described in the context of parallel rendering pipelines.

It should first be noted that the Parallel Rendering Pipelines in the preferred embodiment will receive identical Active Object Lists. Thus, the control processor must provide an Active Object List that would cover multiple scanlines. In the preferred embodiment, the Active Object List may be built by assigning a value to a variable, where the variable represents the number of scanlines upon which to build the Active Object List. Having such an Active Object List means that in some instances, objects will be visible on one scanline, but not visible on the scanline being simultaneously rendered. This would occur for example if an object is last visible on scanline N, where scanlines N and N+1 are being simultaneously rendered. This may also occur when an object is first visible on scanline N+1 and thus is not visible on scanline N. As will be described in more detail below, the filtering of objects that should not be rendered is handled in the Stage 1 processing element.

The architecture of the Stage 1 processing element provides for parallel pipelines in the following manner. First, and perhaps most importantly, as the stage 1 processing element directly evaluates object information to interpolate span coordinates, scanline independence is achieved during vertical interpolation. Scanline independence facilitates the rendering of scanlines in parallel by eliminating the need for objects to be rendered in scanline order (as required by forward differencing interpolation techniques). Second, the vertical interpolation function filters objects. This is accomplished by determining if an object is active on the scanline being rendered. An object is not active on a scanline if there are no corresponding active edges. If an object is not active on a particular scanline, it will not be rendered.

Third, to avoid saturating DMA bandwidth between the active object list and the pipeline, the pipelines are designed to simultaneously receive objects. As a result, the required data bandwidth does not increase as parallel pipelines are added. Fourth, as the pipelines each receive the same object data, the Stage 1 processing unit of each pipeline must be able to distinguish which scanline should be rendered. Accordingly, each stage 1 processing unit defines two input signals which define the particular pipeline ID. The ID can be used to load a different Y value into each of the pipeline, the Y-value indicating the scanline to be rendered.

Finally, the horizontal interpolation of stage 1 supports the parallel pipelines in that it sets up the direct evaluation of shading parameter values in succeeding processing stage elements. The second and third stages of the pipeline perform the direct evaluation of shading parameters. As noted above, such direct evaluation of shading parameters is necessary for scanline independence.

With respect to the third/final stage processing element, besides directly evaluating the shading parameter values, the output lines of the third stage scanline buffers may be tristated. This allows the output lines of the scanline buffers of multiple pipelines to be connected together. External control logic provided by, for example the control processor, would then control which of the scanline buffers would be in a tristate and which one would be enabled and thus providing rendered scanlines to the system display buffer.

Figure 15:
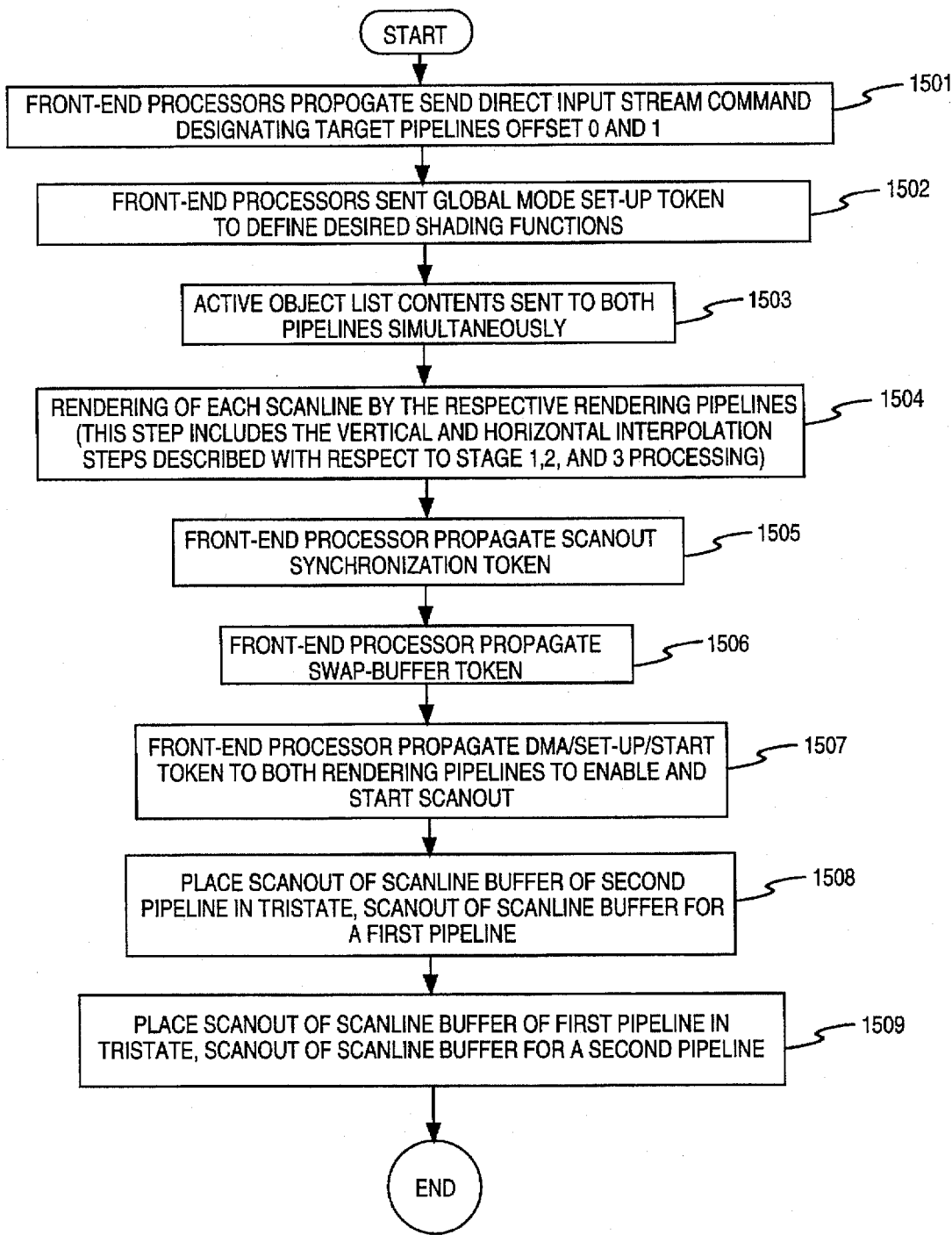
FIG. 15 is a flowchart illustrating the processing flow of multiple parallel rendering pipelines as may be utilized in the preferred embodiment of the present invention.

FIG. 15 is a flowchart illustrating the steps for rendering a 3D image using multiple parallel pipelines. For this example there are two parallel pipelines. First, the control processor sends a direct input stream command to designate which of the pipelines, the input streams should be sent to, step 1501. In this case the direct input stream command will designate both pipelines will receive the input stream (distinguish from step 1507 where input is not sent to both pipelines). Next, the control processor will send global mode set-up tokens to designate the desired shading functions, step 1502. At this point the rendering pipeline is ready to receive the DRAW commands for drawing the individual objects.

The contents of the active object list is now sent simultaneously to each of the rendering pipelines, step 1503. As noted above this occurs by the issuance of a DRAW command for that object being sent down the pipeline. Next, rendering occurs, step 1504. This rendering step is identical to that which would occur for a single pipeline. This rendering step is identical to the rendering steps described with respect to FIGS. 8a-8c. Once the rendering process is completed, the scanout of the rendered scanlines may occur.

The initial step in the scanout process is for the control processor to determine that a previous scanout is complete. This is accomplished by the control processor propagating a scanout synchronization token, step 1505. Once it is determined that the previous scanout is complete, a swap buffers token is propagated, step 1506. By doing this, the scanout process can be performed while the rendering of other scanlines can commence. The control processor then propagates a setup/start token to enable the scanout of the rendered scanlines, step 1507. The scanout of a scanline buffer from the first pipeline to the system frame buffer is performed, step 1508. To perform this step the scanline buffer output of the second pipeline is first placed in a tristate. Once this is completed, the scanout of a scanline buffer from the second pipeline to the system frame buffer is performed, step 1509. To perform this step the output of the first pipeline is placed in a tristate. It should be noted that the pipeline scanout sequence may be switched, i.e. the second pipeline performs the scanout first. Such a switch in the scanout sequence may be performed without departing from the spirit and scope of the present invention. As in the case of a single pipeline, the parallel rendering pipelines may be rendering subsequent scanlines while scanning out the previous scanlines.

Thus, a scanline rendering device is disclosed. Utilizing a scanline approach to hardware rendering of graphical objects, required bandwidth to a system frame buffer is reduced thus enabling the rendering device to be extensible to existing computer system designs. Scanline independence is achieved through direct evaluation of coordinate parameter values, and enables multiple parallel rendering devices. Distributed parameter interpolation reduces bandwidth requirements between shading elements in the rendering device. Finally, a linear interpolation method provides for the exact calculation at extreme endpoints and allows for efficient use of data.

We claim:

1. A computer-implemented method for interpolating pixel values of geometry to be displayed in a computer controlled display system having a display device, wherein said geometry is represented as a set of electrical impluses in said computer controlled display system, said method comprising the steps of:

a) providing a fast set of interpolation parameters for a span of pixels of said geometry to be displayed on said display device, wherein said first set of interpolation parameters are derived from said electrical impulses representing said geometry and represent coordinate information for endpoints of said span;

b) generating an interpolation weight value W for a pixel in said span based on said first set of interpolation parameters and a first interpolation model for said pixel;

c) providing a second set of interpolation parameters for said span, wherein said second set of interpolation parameters are derived from said electrical impulses representing said geometry and represent shading parameter information for said endpoints of said span;

d) generating a value for said pixel based on said interpolation weight value W, said second set of interpolation parameters and a second interpolation model; and e) displaying the pixel values to generate the display of the geometry on the display device.

2. The method as recited in claim 1 wherein said first interpolation model and said second interpolation models are linear interpolations.

3. The method as recited in claim 2 wherein said first set of interpolation parameters for a span is coordinate information for endpoints of said span.

4. The method as recited in claim 1 wherein said first interpolation model is a perspective corrected model.

5. The method as recited in claim 4 wherein said second interpolation model is a linear interpolation model.

* * * * *

UNITED STATES PATENT AND TRADEMARK OFFICE
CERTIFICATE OF CORRECTION

PATENT : 5,706,415

DATED : January 6, 1998

INVENTOR(S) : Kelley, et al.

It is certified that error appears in the above-identified patent and that said Letters Patent is hereby corrected as shown below:

In the claims:

In Claim 1, at column 38, line 66, delete "a fast set" and insert --a first set--.

Signed and Sealed this

Twenty-third Day of November, 1999

Attest:

Q. TODD DICKINSON

*Attesting Officer*   *Acting Commissioner of Patents and Trademarks*